Figure 1:
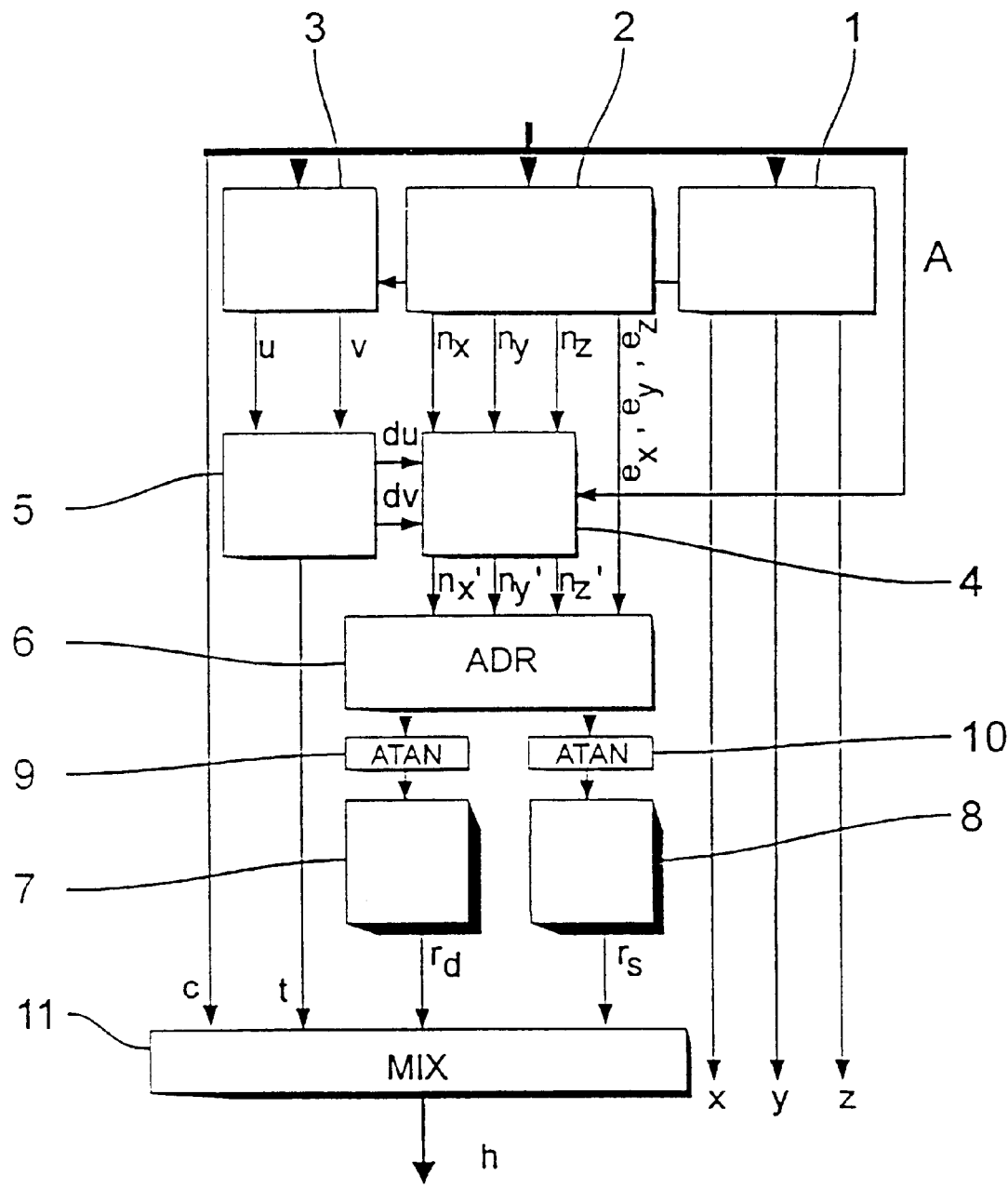

US006130669A

United States Patent [19]
Wittig et al.

[11] Patent Number: 6,130,669
[45] Date of Patent: Oct. 10, 2000

[54] IMAGE PROCESSING METHOD FOR STIMULATING STRUCTURE IN RELIEF, AND DEVICE FOR CARRYING OUT THE METHOD

[75] Inventors: Oliver Wittig; Ines Ernst; Dietmar Jackel, all of Berlin, Germany

[73] Assignee: GMD - Forschungszentrum Informationstechnik GmbH, Sankt Augustin, Germany

[21] Appl. No.: 09/029,132

[22] PCT Filed: Aug. 26, 1996

[86] PCT No.: PCT/DE96/01601

§ 371 Date: May 13, 1998

§ 102(e) Date: May 13, 1998

[87] PCT Pub. No.: WO97/08660

PCT Pub. Date: Mar. 6, 1997

[30] Foreign Application Priority Data

Aug. 25, 1995 [DE] Germany ............................ 195 32 801
Feb. 12, 1996 [DE] Germany ............................ 196 06 356

[51] Int. Cl.$^7$ .................................................. G06F 15/00
[52] U.S. Cl. ............................................................ 345/419
[58] Field of Search .................................... 345/419, 423, 345/425, 426, 427, 441, 442

[56] References Cited

U.S. PATENT DOCUMENTS 5,761,401   6/1998   Kobayashi et al. ..................... 345/430

FOREIGN PATENT DOCUMENTS 0 574 111   12/1993   European Pat. Off. .

OTHER PUBLICATIONS

IBM Technical Disc. Bulletin, Bd. 36, "Rendering of 3D Image Via Interpolated Z–buffer Gradient", Seiten 35–38, Sep. 1993.

Jackel et al. "A Real Time Rendering System With Normal Vector Shading" 9th EP Workshop on Graphics Hardware, Sep. 1994.

Heckbert et al., "Interpolation for Polygon Texture Mapping and Shading" State Of Art Computer Graphics: Visualization and Modelling, pp. 101–111, 1991.

*Primary Examiner*—Phu K. Nguyen
*Attorney, Agent, or Firm*—Venable; George H. Spencer; Robert Kinberg

[57] ABSTRACT

The invention concerns an image-processing method and system for the simulation of structure in relief in image of objects having at least one polygonal surface. The polygonal surface is divided up into a large number of raster elements, and for each raster element, an inclination value determining the inclination of the local surface normal is read out of relief-structure matrix. From the inclination value and either the normal to the polygonal surface or the local normal to the surface, the inclined local normal is calculated and the brightness and/or color of each raster element calculated as a function of the direction of view of the observer, the illumination conditions and the angle of the inclined local normal.

19 Claims, 8 Drawing Sheets

IMAGE PROCESSING METHOD FOR STIMULATING STRUCTURE IN RELIEF, AND DEVICE FOR CARRYING OUT THE METHOD

DESCRIPTION

The invention relates to an image-processing method for simulating a structure in relief in representing objects that particularly comprise at least one polygon surface, as defined in the preamble to claim 1, and an image-processing apparatus, as defined in the preamble to claim 11, for executing the image-processing method.

In computer-graphics systems, bodies are usually simulated by grid models. Each body is described by the spatial coordinates of the node points of the grid model. For display on a screen, the spatial coordinates from the three-dimensional coordinate system are converted, for example through central projection, into a two-dimensional screen-coordinate system.

The surface elements between the node points are usually represented as ideally smooth surfaces without uneven areas. Natural surfaces are, however, not smooth, but are relatively uneven and structured. For example, the surface of human skin has a fine porous structure. The surfaces represented with conventional computer-graphics systems are therefore perceived as unnatural by the viewer. To create a natural surface impression, the grid model would have to be refined so extensively that the spacing between the node points would be smaller than the uneven areas to be modeled. This would place significantly more demanding requirements on the storage capacity and computing capability of the computer-graphics system.

A method of simulating a relief structure in representing such surfaces is known from CATMULL, E. E.: Computer Display of Curved Surfaces, Proc. IEEE Conf. on Computer Graphics, Pattern Recognition and Data Structures, Los Angeles (May 1975), 11. In this case, a two-dimensional image of the desired relief structure—hereinafter referred to as texture image—is superposed over each surface element of the grid model. The brightness of a surface element is not consistent, but varies within the surface element corresponding to the texture image.

If the viewer looks at the surface element from the same direction from which the texture image was also received, and if the illumination is also the same as in the receiving of the texture image, the viewer obtains a natural visual impression of the relief structure of the surface.

In this case, the viewer always perceives the same texture image, regardless of the perspective and the illumination direction. The dependencies on the angle and direction of the reflection behavior of the relief structure of a natural surface are therefore not simulated in this method. The surface thus appears as a smooth surface onto which only a type of photo is placed. Such representations have an unnatural effect similar to that of objects to which a decorative sheet is affixed to give the appearance of a surface structure.

A method of simulating a relief structure in representing surfaces, which also takes into consideration the perspective of the viewer and the illumination direction, is further known from BLINN, J. F.: Simulation of Wrinkled Surfaces, Computer Graphics, 12(3), pp. 286–292, Proc. SIGGRAPH '78.

In this method, the surface normal that is decisive for the reflection behavior of the surface element is first calculated for each surface element. Furthermore, a relief function is defined, which defines the elevations and depressions—in other words, the relief structure of the surface—at each point of the surface element. The local normal vector for each point of the surface element is then calculated from the surface normal and the relief function through partial derivations. Because of the dependency of the reflection behavior on angle and direction, the brightness varies within the surface element as a function of the position of the local surface normals. Consequently, the relief structure of the surface can be simulated with consideration of the locally-alternating illumination and viewing directions and the resulting, different reflection behavior of the surface.

This method creates a relatively natural impression of the surface for all positions of the object. However, a disadvantage of the method is that partial derivations of the relief functions must be formed for determining the local brightness within a surface element, which requires a substantial amount of calculation effort. This lengthens the time span necessary for calculating an image, which hinders a real-time representation of movement, particularly with varying light conditions.

It is therefore particularly the object of the invention to provide an image-processing method for simulating a relief structure in the representation of computer-modeled surfaces of an object, as well as an apparatus for executing the image-processing method, which also permits rapid, real-time representations of movement.

The object is accomplished by the features disclosed in claim 1, and—with regard to the image-processing apparatus—by the features of claim 11.

The invention includes the technical teaching of dividing each polygon surface—as a reference surface—of an object to be represented into a plurality of pixels, the polygon surface being defined by the node points of the object represented as a grid model; determining an inclined local surface normal—hereinafter referred to as pixel normal—for each pixel from an original relief value that defines the relief structure of the surface and either the surface normal of the polygon surface or a local surface normal; and calculating the brightness of the pixel with the use of a local illumination model as a function of the position of the pixel normal relative to the illumination direction and the viewing direction.

Thus, the precise spatial position of each surface element need no longer be re-ascertained in all subsequent spatial movements performed by the object. The treatment of the simplified "wire model" is sufficient here. The spatial structure of the surface is updated based on the reference surfaces, without consideration of the actual spatial position of the pixels in relation to the reference surface. This is further treated to some extent as a two-dimensional structure, but this structure does not remain unchanged, as in a photographic image rotated in space; instead, the information that changes when the viewing direction changes is purposefully changed. The surface normal associated with each pixel and representing the offset of the orientation of the pixel surface with respect to the orientation of the reference surface serves this purpose. With this value, it is possible, with little effort, to "match" the optical impression of the polygon surface oriented spatially differently.

The invention makes use of the knowledge that the optical impression of the relief structure of a surface is not determined so much from the actual (fine) position of the pixel in space, but from interaction with light sources in the form of light and shadow formation, or reflection at other objects. These actions are essentially dependent on the spatial position of the local surface normal of the pixel relative to the viewing direction. This permits a very rapid, uncomplicated updating as a function of the viewer's perspective of the relevant illumination direction. In contrast, the local depressions and elevations of the surface contour have only little impact on the optical impression of the relief structure, and can therefore be disregarded.

The invention includes all options that involve replacing an object to be represented for display with an object having a simplified surface structure, with the fine surface structure being replaced by a piece of local information regarding the orientation of the surface within the framework of the fine structure, and the original fine structure being replaced by a plane image that is changed with consideration of the effects of the illumination and viewing directions. In particular, the effect of illuminating an object from the inside (luminous object) or the influence of other effects (reflections) originating from other objects is also taken into consideration.

The method of the invention permits the simulation of a relief structure in the representation of a body formed by polygon surfaces. The spatial position of the polygon surface is usually defined by the spatial coordinates of the node points of a grid model that simulates the body or surface to be represented in the computer.

The reference surface need not be level in every case; as will be shown below, it can have one or a plurality of deformities (for example bulges) that approximates the actual surface shape of the object to be represented. An important point is that the surface shape of the reference surfaces is different from the fine structure of the object to be represented, which difference is compensated by the measures of the invention.

Wherever the invention is described below in conjunction with polygon surfaces, this may refer to all of the elements of an object that represent a surface segment, the elements having a reduced structure information in comparison to the fine structure of the surface to be represented. For example, the surface segments can be convex, such as the segments of a ball, to make the impacts, that is, the changes in direction, as small as possible at the boundaries of the segments in the region of the surface. The invention encompasses all measures in which, in the representation, a spatial base structure of an object is superposed with a fine surface structure containing information that characterizes the local orientation of the surface and is used to generate the optical effects of the orientation of illumination and viewing on the relevant surface element, or its vicinity.

A particular advantage of the invention is that the operations relevant to the structure, which are to be performed with the measures of the invention, can be divided into repeating regions (modules), so the repeating portions of a structure permit an additional reduction in the calculation effort.

The measures of the invention can be implemented with both purely software-based measures and suitable special hardware. The advantage of the hardware-based solution is that considerable time advantages can be attained particularly through operations that are performed simultaneously in assemblies disposed in parallel.

Wherever "assemblies" are discussed below, they may also be functional groups, for example in the form of electrical circuits. It is also possible that one and the same assembly or functional group consecutively performs different operations, as is generally the case in processor technology. As explained, however, speed advantages can be attained especially when functional groups are active adjacently and in parallel.

Within the scope of the measures of the invention for representing objects within the framework of image processing, the individual polygon surfaces are preferably divided into a plurality of parallel, equidistant scanlines in which the pixels are in turn disposed equidistantly.

The polygon surface is divided by the first assembly or functional group of a calculation unit, which receives at its input a parameter set representing the spatial position of the polygon surface, and which outputs a plurality of coordinate sets at its output, the sets representing the spatial position of a respective pixel.

A relief value that defines the relief structure is then determined for each pixel as a function of the position of the pixel within the polygon surface.

In this connection, it is important that the relief value is solely dependent on the position of the pixel within the polygon surface, not the global position of the pixel or the spatial position of the polygon surface. This is necessary, because otherwise the relief structure appearing on the polygon surface would "migrate" on the surface during a movement of the polygon.

Therefore, a storage matrix—also referred to hereinafter as relief matrix—is provided, which contains the inclination values of the local surface normal that result from the course of the surface for a predetermined relief structure. Each element of the storage matrix is therefore associated with a point of the relief structure, and contains an inclination value for this point of the relief structure. For example, the inclination vector can be stored as an inclination value, that is, the vector that must be added to the local surface normal of the smooth surface in order to create the impression of the relief structure. It is also possible to store a rotation matrix as an inclination value, with the matrix defining the rotation of the local surface normal. This is particularly advantageous, because the length of the local surface normal is not changed by a rotation.

In this connection, it is important that the relief structure itself is not stored as a relief in the relief matrix, but the inclination of the local surface normal resulting from the course of the surface is stored. The local surface normal that is inclined because of the relief structure can therefore be calculated advantageously quickly and with little calculation effort.

For each pixel, an inclination value that represents the inclination of the local surface of this pixel that has been caused by the relief structure is read out. The storage matrix is therefore addressed by the coordinate set of the respective pixel.

In a preferred embodiment of the invention, therefore, for each position of a polygon, a transformation matrix M is calculated that transforms the spatial coordinates $(x_i, y_i, z_i)$ of the pixels into a two-dimensional coordinate system (U,V):

$$\begin{bmatrix} u \\ v \end{bmatrix} = [x \ y \ z] \cdot \begin{bmatrix} M_{00} & M_{01} \\ M_{10} & M_{11} \\ M_{20} & M_{21} \end{bmatrix}$$

The U, V value pair serves in addressing the relief matrix from which the relief value of the pixel is then read out. In this connection, it is important that the transformation matrix M be calculated individually for each polygon, or each position of a polygon, so that the same element of the relief matrix, and therefore the same relief value, is always associated with each pixel independently of the spatial position of the polygon.

The transformation matrix M is calculated, for example, from the spatial coordinates of the corner points of the polygon surface. If the polygon surface is a triangle, for example, then the spatial coordinates $(x_i, y_i, z_i)$ of the three corner points $P_1$, $P_2$, $P_3$ of the triangle are known. As explained above, the mapping of the three-dimensional coordinate system into the U, V coordinate system must be independent of the position of the polygon surface so that the relief structure simulated on the polygon surface does not migrate within the polygon surface when the surface moves. This can be achieved, for example, by mapping the corner points $P_i$ of a polygon surface onto certain points $P'_i$ in the U, V coordinate system, independently of the position of the polygon surface. The points $P'_i$ are first predetermined arbitrarily. If a triangle is observed as the polygon surface, the following applies for the mapping of the three corner points $P_i(x_i\ y_i\ z_i)$ of the triangle of the three-dimensional X, Y, Z coordinate system into the U, V coordinate system.

$$\begin{bmatrix} u_1 \\ v_1 \end{bmatrix} = [x_1\ y_1\ z_1] \cdot \begin{bmatrix} M_{00} & M_{01} \\ M_{10} & M_{11} \\ M_{20} & M_{21} \end{bmatrix}$$

$$\begin{bmatrix} u_2 \\ v_2 \end{bmatrix} = [x_2\ y_2\ z_2] \cdot \begin{bmatrix} M_{00} & M_{01} \\ M_{10} & M_{11} \\ M_{20} & M_{21} \end{bmatrix}$$

$$\begin{bmatrix} u_3 \\ v_3 \end{bmatrix} = [x_3\ y_3\ z_3] \cdot \begin{bmatrix} M_{00} & M_{01} \\ M_{10} & M_{11} \\ M_{20} & M_{21} \end{bmatrix}$$

Because the points $P'_i$ $(u_i, v_i)$ are predetermined arbitrarily, an equation system having six linearly independent equations is known. From this system, the six elements $M_{ij}$ of the transformation matrix can be calculated in a simple manner, for example with the use of Cramer's Rule. The transformation matrix M is therefore usually calculated once for each polygon surface.

If the polygon surface is viewed in perspective, distortions tend to occur if the viewer looks at the polygon surface at an acute angle, because in this case the corner points of the polygon surface are at a different distance from the viewer. In a preferred embodiment of the method of the invention, therefore, homogenized coordinates x, y, z are used for defining the position of the corner points of the polygon surface. For this purpose, the coordinates x*, y*, z* of the corner points are respectively multiplied by the so-called homogeneous component 1/w, which, for each corner point, is proportional to the distance of this corner point from the viewer.

As explained above, the optical impression of the relief structure is essentially dependent on the position of the local surface normal relative to the viewing direction and the illumination direction. In this variation of the invention, the relief value stored in the relief matrix therefore contains two components $\Delta u$, $\Delta v$, which define the local inclination of the local surface normal that is caused by the relief structure. Thus, the component $\Delta u$ determines to what degree the local surface normal is inclined in the direction of the U axis, while the component $\Delta v$ determines the inclination of the local surface normal with respect to the V axis.

Not only is the inclination of the local surface normal caused by the relief structure decisive in the U, V coordinate system; the corresponding inclination of the pixel normal is decisive in the spatial-coordinate system as well.

The aforementioned calculation unit therefore includes a second assembly, which uses the first parameter set representing the spatial position of the polygon surface, and/or the coordinate sets of the individual pixels, to calculate a second parameter set, which represents the spatial position of the surface normal of the polygon surface or the local surface normal of the individual pixels, without considering the relief structure.

The calculation unit further includes a third assembly, which uses the inclination value—in this variation, the components $\Delta u$, $\Delta v$—and the surface normal of the polygon surface, or the local surface normal of the smooth surface, to calculate the inclined local surface normal. For this purpose, the input of the third assembly receives the coordinate sets of the pixels and the associated inclination values from the relief matrix, and uses them to calculate a third parameter set, which represents the spatial position of the surface normal of the polygon surface, taking into consideration the relief structure.

In a preferred variation of the invention, therefore, a further transformation matrix A is calculated for each polygon; this matrix permits the calculation of the inclination of the pixel normal in the spatial-coordinate system from the components $\Delta u$, $\Delta v$.

For the pixel normal $(n'_x, n'_y, n'_z)^T$, $$\begin{bmatrix} n'_x \\ n'_y \\ n'_z \end{bmatrix} = \begin{bmatrix} n_x \\ n_y \\ n_z \end{bmatrix} + \begin{bmatrix} A_{00} & A_{01} \\ A_{10} & A_{11} \\ A_{20} & A_{21} \end{bmatrix} \cdot \begin{bmatrix} \Delta u \\ \Delta v \end{bmatrix}$$

follows from the surface normal $(n_x, n_y, n_z)^T$ of the smooth surface and the relief-structure values $\Delta u$, $\Delta v$.

According to the invention, different options are provided for calculating the transformation matrix A, some of which are described briefly below.

In one variation of the invention, the transformation matrix A is calculated from the transformation matrix M, a geometry-transformation matrix G that is predetermined for the polygon surface, and a further matrix T.

First, the normalized normal vector $n_N = (n_{xN}\ n_{yN}\ n_{zN})^T$ is calculated from the surface normal of the polygon surface $n = (n_x\ n_y\ n_z)^T$:

$$n_N = \frac{n}{|n|}$$

For the transformation matrix T, it follows that:

$$T = [\ e_y \times n\quad n \times (e_y \times n)\quad n_N\ ]^T$$

or, written in terms of components:

$$T = \begin{bmatrix} n_z & -n_y n_x & n_{xN} \\ 0 & n_z^2 & n_{yN} \\ -n_x & -n_y n_z & n_{zN} \end{bmatrix}^T$$

In the same way, the transformation matrix $T_L$ is calculated from the local surface normal $n_L$.

With the geometry-transformation matrix G, it then follows that:

$$G' = G \cdot T^{-1}$$

From this, the transformation matrix A can be calculated directly:

$A = G'^\cdot T_L \cdot M$ or, written in terms of components:

$$\begin{bmatrix} A_{00} & A_{01} \\ A_{10} & A_{11} \\ A_{20} & A_{21} \end{bmatrix} = \begin{bmatrix} G_{00} & G_{01} & G_{02} \\ G_{10} & G_{11} & G_{12} \\ G_{20} & G_{21} & G_{22} \end{bmatrix} \cdot \begin{bmatrix} T_{00} & T_{01} & T_{02} \\ T_{10} & T_{11} & T_{12} \\ T_{20} & T_{21} & T_{22} \end{bmatrix} \cdot \begin{bmatrix} M_{00} & M_{01} \\ M_{10} & M_{11} \\ M_{20} & M_{21} \end{bmatrix}$$

Relatively complicated and calculation-intensive vectorial operations must be performed in the above-described calculation of the transformation matrix T or $T_L$.

In another variation of the invention, therefore, a plurality of transformation matrices T or $T_L$ is calculated in advance for different spatial positions of the surface normal, and each is stored in an element of a three-dimensional storage matrix S. Each element of the storage matrix S therefore contains a complete transformation matrix T or $T_L$.

The storage matrix S simulates a cubic envelope surface, the center point of which is the origin of the surface normal. A transformation matrix T or $T_L$ is associated with each point on the envelope surface. Therefore, for determining the transformation matrix T or $T_L$, the point of intersection of the surface normal or its extension with the cubic envelope surface must be determined.

The first dimension of the storage matrix S is addressed as a function of the side surface of the cubic envelope surface that is intersected by the surface normal. The following applies for the addressing value $a_1$ of the first dimension of the storage matrix S:

$$a_1 = \begin{cases} 1 & \text{if} \quad \max[n_x, n_y, n_z] = n_x > 0 \\ 2 & \text{if} \quad \max[n_x, n_y, n_z] = n_x < 0 \\ 3 & \text{if} \quad \max[n_x, n_y, n_z] = n_y > 0 \\ 4 & \text{if} \quad \max[n_x, n_y, n_z] = n_y < 0 \\ 5 & \text{if} \quad \max[n_x, n_y, n_z] = n_z > 0 \\ 6 & \text{if} \quad \max[n_x, n_y, n_z] = n_z < 0 \end{cases}$$

The other two dimensions of the storage matrix S are addressed as a function of the position of the point of intersection within side surface penetrated by the surface normal. The following applies for the addressing values $a_2$, $a_3$:

$$a_2 = \begin{cases} \arctan\left(\dfrac{n_y}{|n_x|}\right) & \text{if} \quad a_1 = 1 \text{ or } 2 \\ \arctan\left(\dfrac{n_x}{|n_y|}\right) & \text{if} \quad a_1 = 3 \text{ or } 4 \\ \arctan\left(\dfrac{n_x}{|n_z|}\right) & \text{if} \quad a_1 = 5 \text{ or } 6 \end{cases}$$

$$a_3 = \begin{cases} \arctan\left(\dfrac{n_z}{|n_x|}\right) & \text{if} \quad a_1 = 1 \text{ or } 2 \\ \arctan\left(\dfrac{n_z}{|n_y|}\right) & \text{if} \quad a_1 = 3 \text{ or } 4 \\ \arctan\left(\dfrac{n_y}{|n_z|}\right) & \text{if} \quad a_1 = 5 \text{ or } 6 \end{cases}$$

The transformation matrix is then read out of the storage matrix S:

$T = S(a_1, a_2, a_3)$ or $T_L = S(a_1, a_2, a_3)$

The transformation matrix A is calculated in the same way as in the above-described variation of the invention:

$A = G'^\cdot T_L \cdot M$

This variation advantageously permits a relatively rapid calculation of the transformation matrix A. The elements of the storage matrix S are preferably calculated in the same way as the transformation matrices T in the above-described variation.

In the above-described variation of the invention, the pixel normal that is inclined because of the relief structure is calculated through multiplication of the inclination vector in the U, V coordinate system by the transformation matrix A.

In another variation of the invention, the inclined pixel normal is calculated with the aid of so-called quaternions. Quaternions are vectorial operations that include a scalar component and three vectorial components. From the inclination vector $d = [\Delta u, \Delta v, 0 0]^T$ in the U, V coordinate system and the quaternion $q_i = (s_i, (c_x^i, c_y^i, c_z^i))$, for the inclined pixel normal $(n'_x, n'_y, n'_z)^T$ in the X, Y, Z coordinate system, the following results from the pixel normal $(n_x, n_y, n_z)^T$ of the smooth polygon surface:

$$\begin{bmatrix} n'_x \\ n'_y \\ n'_z \end{bmatrix} = \begin{bmatrix} n_x \\ n_y \\ n_z \end{bmatrix} + q_i^{-1} \cdot d \cdot q_i$$

The quaternions are calculated, for example, through interpolation of the quaternions that are predetermined for each pixel in the corner points of the polygon surface. The interpolation can advantageously be performed component-wise, and therefore only requires a small amount of effort. In this case, a quaternion is predetermined for each corner point of the polygon surface, and the quaternions of the individual pixels are then calculated from this quaternion.

The relief structure effects an inclination of the pixel normal with respect to the surface normal of the smooth surface. The inclination of the pixel normal caused by the relief structure can be oriented either with respect to the surface normal of the entire polygon, or with respect to the pixel normal.

If the inclination of the pixel normal because of the relief structure is oriented with respect to the surface normal of the polygon surface, a relief structure can only be simulated correctly on planar polygon surfaces, because in such polygon surfaces, the surface normal is only consistent within the polygon surface. The calculation of the surface normal of the polygon surface can be determined from the spatial coordinates of the corner points of the polygon surface. For this purpose, for example, the edge vectors of the polygon surface are calculated through component-wise subtraction of the spatial coordinates of adjacent corner points. The edge vectors determined in this way naturally lie in the plane defined by the polygon surface. The surface normal then results as a vector product of two edge vectors.

In curved polygon surfaces, in contrast, the surface normal varies within the polygon surface. The inclination of the pixel normal caused by the relief structure must therefore be oriented with respect to the local surface normal of the smooth, but curved, polygon surface. Therefore, the local surface normal of the smooth polygon surface—that is, the surface having no relief structure—must first be calculated for all pixels. This is preferably effected through interpolation of the corner-point normals. To this end, in curved polygon surfaces, the local surface normals are predetermined in the corner points of the polygon surface. The local surface normal at an arbitrary point on the polygon surface results from the interpolation of the corner-point normals.

The predetermining of the corner-point normals further ensures a "gentle" transition between adjacent polygon surfaces, because a corner-point normal is respectively part of a plurality of adjacent polygon surfaces, and the surface is therefore smooth at the connecting line between two adjacent polygon surfaces.

In the interpolation of the local surface normal of the curved polygon surface from the corner-point normals, a normal vector representing an intermediate position must be determined as a function of, on the one hand, the position of the pixel to be observed, the pixel being located between the corner points of the polygon surface, and, on the other hand, as a function of the corner-point normals. If an interpolation is to be performed between only two corner-point normals, that is, on a connecting line between the two corner points, the one corner-point normal can be mapped through a shift and a rotation toward the other corner-point normal. A problem in the interpolation of the local surface normal is that a component-wise interpolation cannot be performed simply in a mapping comprising a rotation and a shift.

In an advantageous variation of the invention, therefore, the local surface normal is interpolated with the aid of the so-called quaternions. Quaternions are four-dimensional vectorial operators having a scalar component and three vectorial components. A quaternion is predetermined for each corner-point normal. An arbitrary local surface normal can advantageously be interpolated through component-wise interpolation of the quaternions. If, for example, the local surface normal is to be calculated in the center between two corner points, and the interpolation is based solely on these two corner points, the quaternion of this local surface normal, resulting in this case as the average value of the quaternions predetermined for the two corner-point normals, is to be determined. The local surface normal then results from the linking of the one corner-point normal with the calculated quaternion.

Hence, the spatial position of the local surface normal (pixel normal) and the position of the pixel are known for each pixel of the polygon surface. The method of the invention therefore provides the calculation of a brightness value or color value for each pixel, based on a local illumination model. As described in detail above, the brightness that a viewer perceives a pixel to have is essentially dependent on the position of the pixel normal relative to the illumination direction and the viewing direction, that is, the perspective of the viewer.

The aforementioned calculation unit includes a fourth assembly for calculating the brightness value and color value. At its output, the fourth assembly receives the third parameter set, which represents the spatial position of the local, inclined surface normal. The brightness of a pixel is therefore determined by the orientation of the local surface normal of the polygon surface, taking into consideration the relief structure.

The fourth assembly preferably also receives a predetermined, fourth parameter set, which represents the spatial position of the viewer, and, possibly, a fifth parameter set representing the illumination conditions.

In a variation of the invention, it is significant enough to merit protection that diffuse reflection at the pixel is assumed for calculating the brightness of the pixel. The light impacting the pixel is radiated uniformly in all directions. The brightness of a pixel that is perceived by a viewer is therefore basically a function of the orientation of the pixel normal with respect to the illumination environment. Light that is incident parallel to the pixel normal is preferably reflected. If the direction of light incidence differs from the pixel normal, the light is reflected correspondingly less intensely. Therefore, each pixel can be allocated a reflection characteristic that represents the dependence of the pixel brightness on the direction and angle of the light incidence.

To define the reflection characteristic, in this variation of the invention, the angular differences between the pixel normal and the illumination direction are calculated in two different, preferably perpendicular, planes. The reflection behavior is then calculated from these two angular differences. In a preferred embodiment of this variation, the two angular differences serve in addressing a two-dimensional matrix—referred to hereinafter as reflection matrix—that contains the angle- and direction-dependent reflection factors. In this way, it is possible to define an arbitrary reflection characteristic of the pixel.

In another variation of the invention, the brightness of the pixel is calculated as a function of the position of the pixel normal relative to the viewing direction. This embodiment utilizes the knowledge that the pixel appears brightest when the pixel normal and the viewing direction extend parallel, because the maximum amount of the pixel surface of the pixel is then visible. If the pixel normal is inclined with respect to the viewing direction, the pixel appears to be correspondingly darker. Thus, it is possible to calculate a reflection characteristic that represents the brightness of a pixel as a function of the position of the pixel normal relative to the viewing direction.

To define the reflection characteristic, the angular differences between the pixel normal and the viewing direction are calculated in two different, preferably perpendicular, planes. The reflection factor of the pixel is then calculated from these two angular differences.

In a preferred embodiment of this variation, the two angular differences serve in addressing a two-dimensional matrix in which the reflection factor for different values of the angular differences is stored.

In another variation of the invention, it is significant enough to merit protection that mirror reflection at the pixel is assumed for calculating the brightness of the pixel. The light impacting the pixel is reflected at the pixel according to the laws of geometrical optics, with the angle of incidence and the angle of reflection being identical.

Conversely, if a "line of sight" originating from the viewer is observed, rather than a beam of light originating from a light source, this "line of sight" is reflected at the pixel in the direction of a reflection vector. The spatial position of this reflection vector likewise results from the fact that the angles of incidence and reflection are identical according to the laws of geometrical optics.

An optimum viewing condition for the viewer is for the reflection vector to extend parallel to the direction of light incidence, because then the viewer has an optimum view of the light source and the pixel appears to be brightest. If, however, the reflection vector differs from the direction of light incidence, the reflection condition is not met exactly and the pixel appears to be correspondingly darker.

A reflection characteristic can be defined that represents the dependence of the reflection on angle and direction. In contrast to diffuse reflection, the reflection factor here is also dependent on the viewing direction, and not solely on the position of the pixel normal relative to the illumination direction.

To calculate the reflection characteristic, the angular differences between the reflection vector and the illumination direction are calculated in two different, preferably perpendicular, planes. The reflection factor for the mirror reflection is then calculated from these angles. In a preferred embodiment of this variation, the two angles serve in addressing a reflection matrix that defines the reflection characteristic of the pixel.

The two aforementioned variations can also be combined through the calculation of a unified reflection factor from the reflection factor for diffuse reflection and the reflection factor for mirror reflection. The two reflection factors can be weighted differently. In this way, it is possible to simulate a natural reflection behavior.

In another variation of the invention, it is significant enough to merit protection that a cubic envelope surface is placed around the pixel for calculating the brightness of the pixel, with a value for the brightness of the pixel being associated with each surface element of the envelope surface. The envelope surface therefore contains an all-around recording of the environment from the perspective of the pixel.

As in the above-described variations of the brightness calculation, diffuse reflection or mirror reflection can be selectively assumed.

If diffuse reflection is assumed, according to the method of the invention, the point of intersection of the pixel normal or its extension with the envelope surface is determined. The value of the envelope surface that is associated with this point of intersection then forms the brightness value of the pixel.

If, in contrast, mirror reflection is assumed at the pixel, the point of intersection of the reflection vector with the envelope surface is determined, and the associated value of the envelope surface is used as a brightness value of the pixel.

In a preferred embodiment of this variation, a three-dimensional matrix—hereinafter referred to as reflection matrix—serves in simulating the cubic envelope surface and in defining the reflection factors for the different illumination and viewing directions. The cubic envelope surface has six side surfaces, which are respectively assigned a distribution of values of the reflection factor. First, it is determined which side surface of the envelope surface is penetrated by the pixel normal or reflection vector, with each side surface being allocated a value that addresses the first dimension of the reflection matrix. The other two dimensions of the reflection matrix are addressed by the angles of the pixel normal or reflection vector with respect to the axis of the coordinate system penetrating the side surface. In other words, the two other dimensions of the reflection matrix are addressed as a function of the position of the point of intersection on the side surface.

In an advantageous embodiment of the method of the invention, it is provided that each polygon surface is superposed with a two-dimensional texture image in addition to the relief structure. Consequently, color or brightness patterns of natural surfaces can be simulated. Superposing the texture image can be effected in the same manner as superposing the relief structure. Hence, a value for the texture image is associated with each pixel of the polygon surface. An important point is that the value for the texture image is solely dependent on the position of the pixel within the polygon surface, not on the spatial position of the polygon surface. Otherwise, the texture image would "migrate" within the polygon surface if the surface moved.

The above-described method permits a simulation of a relief structure in the representation of a polygon surface in that the local surface normal within the polygon surface is inclined with respect to the surface normal of the entire polygon surface as a function of a predetermined relief structure.

A prerequisite for this is that the polygon surface be completely level and therefore have a consistent surface normal that can serve as a reference value for the orientation of the local surface normal for simulating the relief structure.

In modeling sharply-curved surfaces, it is often desirable to adapt the shape of the polygon surface to the shape of the surface to be represented. The surface normal of the polygon surface is not consistent in this case, but varies within the polygon surface. This is not attributed to the inclination of the local surface normal because of the relief structure, but is only a function of the shape of the smooth surface.

The surface normal is predetermined, for example, in the corner points of the polygon. The local surface normal within the polygon surface is then calculated through interpolation of the corner-point normals.

The inclination of the surface normal because of the relief structure is oriented with respect to the local surface normal obtained through interpolation, and not—as with the assumption of a planar polygon surface—with respect to the surface normal of the entire polygon surface.

In the above-described variations of the image-processing method of the invention, the relief structure simulated on the surface of the object is constant over time. Often, however, it is desirable to simulate a relief structure that varies over time, for example to permit the simulation of a change in the surface structure. In an advantageous, refining variation of the invention, therefore, the inclination value that is read out of the relief matrix is multiplied by a scaling factor prior to the calculation of the local, inclined surface normal to permit a change to the spatial relief effect of the relief structure to be simulated. If the scaling factor equals zero, the surface of the object to be represented appears to be completely smooth. As the scaling factor increases, the relief effect of the simulated relief structure that appears on the surface also increases. In this way, the relief effect of the relief structure can be set arbitrarily. It is also possible to simulate the formation of a relief structure by increasing the scaling factor gradually from zero during the representation.

In a contrasting variation of the invention, for simulating a dynamic relief structure, a plurality of relief matrices is provided, which matrices respectively reflect an instantaneous recording of the relief structure to be simulated. During the representation of the spatial scene, the individual relief matrices are selected consecutively for creating a dynamic image impression, and are used to calculate the inclined, local surface normal. Because the contents of the individual relief matrices can be calculated in advance, hardly any additional calculating effort is necessary during the actual representation, which is particularly critical in a real-time representation of courses of movement. It is only necessary that the desired relief matrix be selected and connected to the assembly that calculates the inclined, local surface normal from the surface normal of the smooth surface and the inclination value.

In the same way, the texture appearing on the object's surface can be simulated dynamically. In an advantageous variation of the image-processing method of the invention, therefore, numerous texture memories are provided, which respectively represent an instantaneous recording of the texture image to be simulated on the object's surface. To create a movement impression, it is only necessary to switch between the individual texture memories during the representation. Scarcely any additional calculation effort is needed during this representation, because the contents of the texture memory can be calculated in advance.

Because the texture memory usually contains the texture image directly in digitized form, it is advantageously possible to provide the image-replication memory of a video- or computer-graphics system as a texture memory, or to connect the texture memory to this type of system in some other manner. In this way, it is possible to use conventional video- or computer-graphics systems to simulate arbitrary animated image sequences as a texture image on the object's surface.

As described in detail above, the image-processing method of the invention provides a plurality of storage matrices (texture matrix, relief-structure matrix, reflection matrix for mirror reflection and diffuse reflection, environment matrix) that influence the mapping behavior of the image-processing method, and determine the appearance image of the spatial scene to be represented. The method described above for dynamically simulating relief structures or textures can be applied in the same way to all storage matrices that influence the appearance image of the spatial scene. For example, interesting light effects can be attained through dynamic changes in the reflection matrices.

The different options for dynamic simulation can be used alone or in random combination.

As described above, the body or surface to be displayed on the screen is simulated as a grid model in the computer. The surface therefore comprises numerous polygon surfaces whose spatial position is defined by the spatial coordinates of the node points of the grid model. In an advantageous embodiment of the invention, triangles are used as the polygon surfaces. This means that three points are respectively connected by edges in the grid model. An advantage of using triangles for modeling the surfaces is that the surface normal of a triangle is defined unambiguously by the spatial coordinates of the corner points, because three points always lie in a plane, while in polygons having more than three corner points, it is possible that the corner points do not lie exactly in a plane, so the surface normal is not defined exactly.

The above-described method is not limited to a monochromatic representation. Rather, the method can be executed consecutively or in parallel for a plurality of colors, preferably the primary colors. A color-dependent reflection or absorption behavior of the surface can be taken into consideration.

In an advantageous variation of the invention, the apparatus is configured as an integrated circuit in a processor system, or as an autonomous processor, whose input receives a parameter set that determines, among other things, the spatial position of a polygon. At the output, the spatial coordinates of individual pixels of the polygon surface and the brightness value of the pixels are emitted, with consideration of a predetermined relief structure. To represent the polygon surface on a screen, the spatial coordinates of the individual pixels need merely be transformed in a conventional manner into a two-dimensional screen-coordinate system. The circuit can thus be advantageously incorporated into existing computer-graphics systems.

The solution according to the invention advantageously permits the simulation of a relief structure in the representation of the polygon surface of a grid model. The image-processing method of the invention advantageously permits a representation of the individual polygon surfaces independently of one another. This means that it is also possible to represent a polygon surface without knowledge of the data of other polygon surfaces. The image-processing apparatus can therefore be advantageously constructed from a plurality of calculating units disposed in parallel. This advantageously permits incorporation into a parallel calculation-unit arrangement, and therefore a high processing speed.

Figure 2:
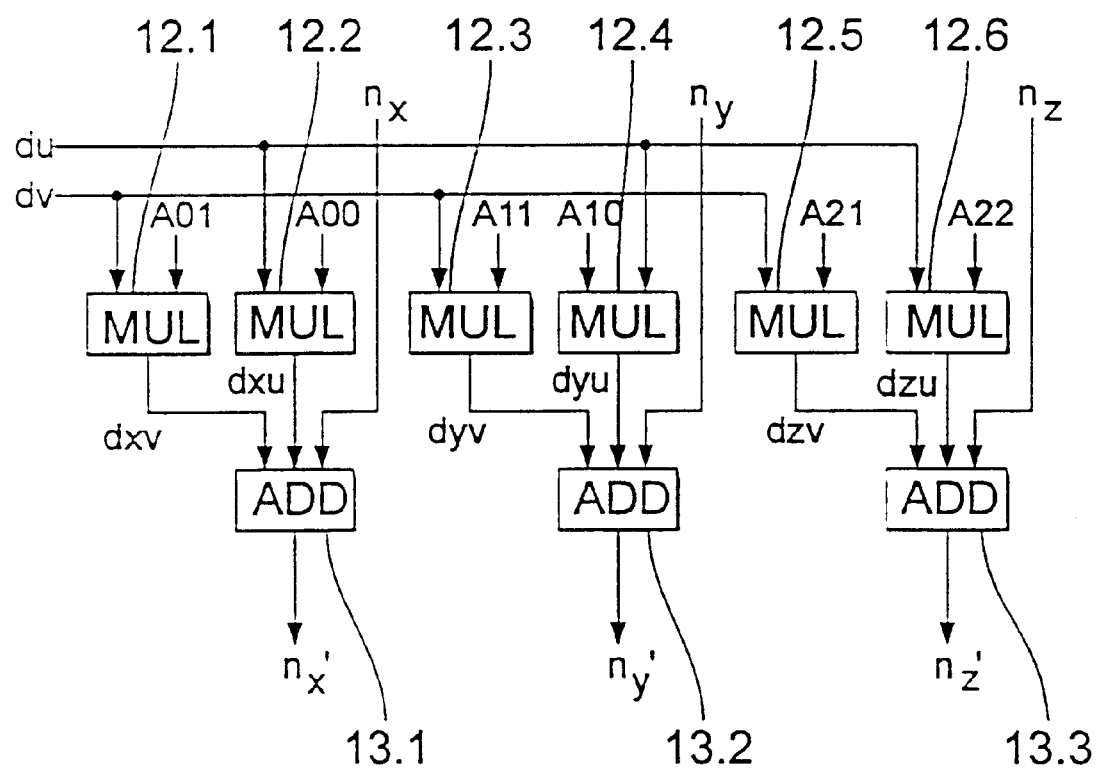
Figure 3A:
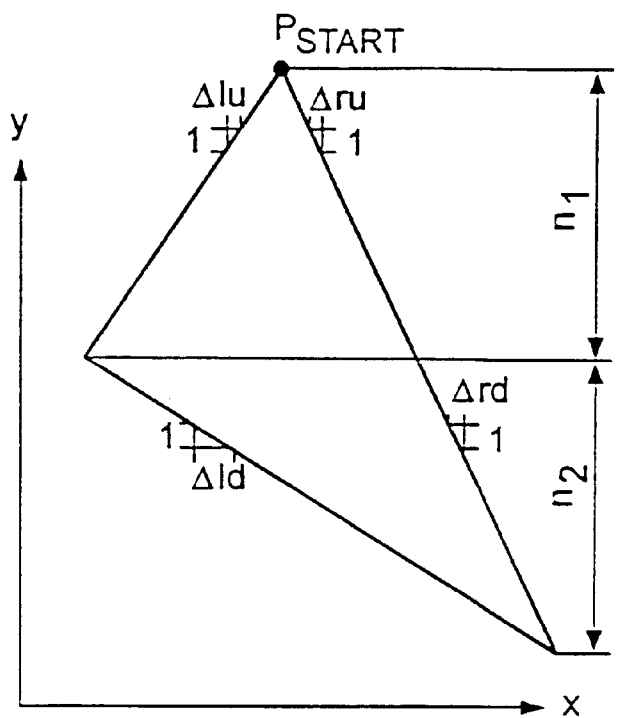
Figure 3B:
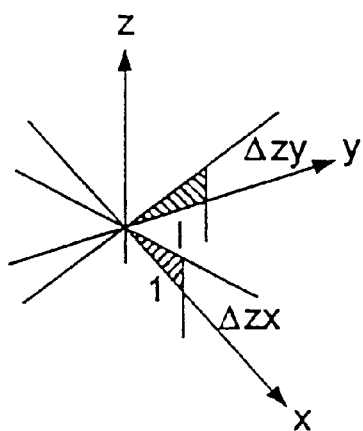
Figure 4:
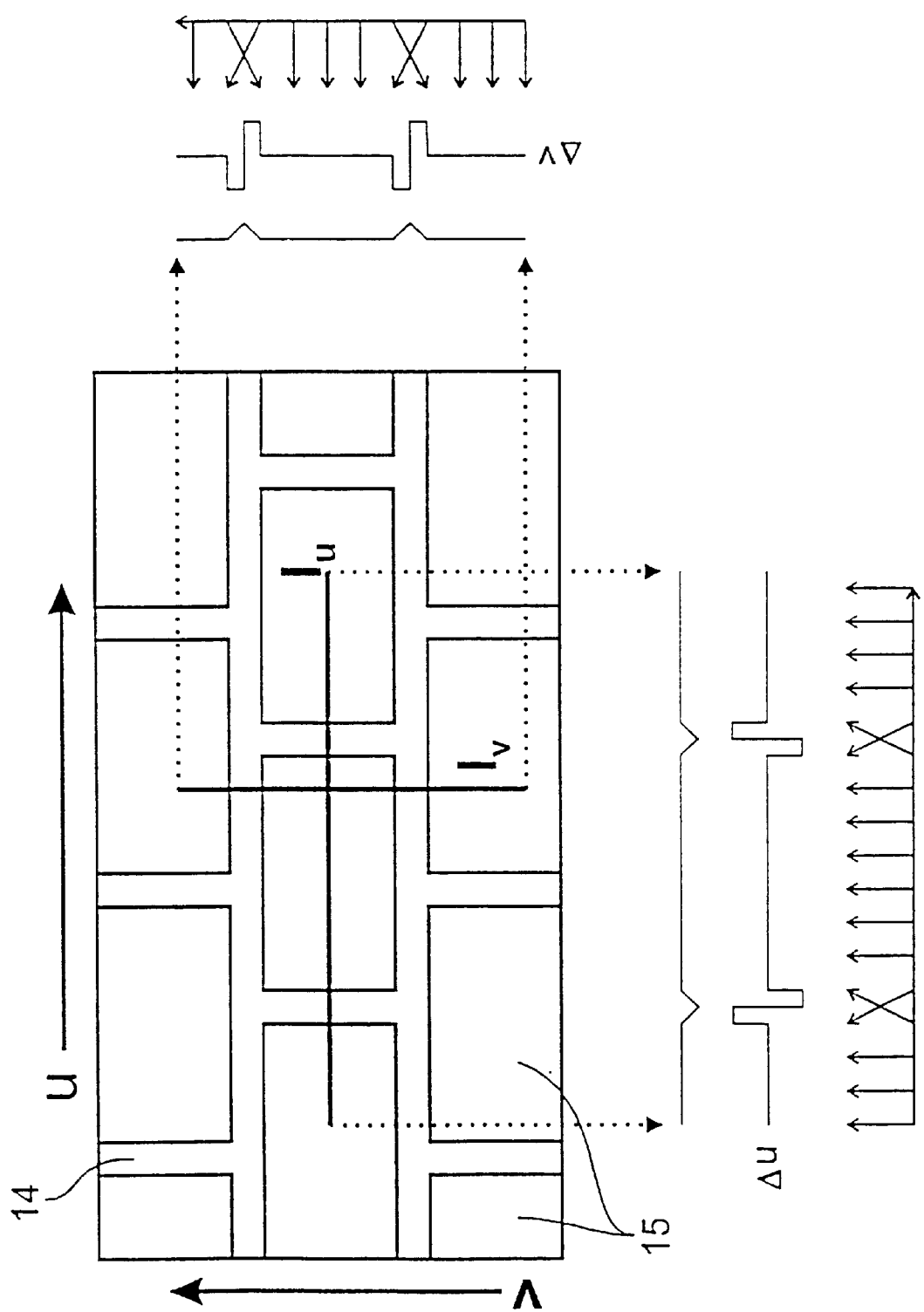
Figure 5A:
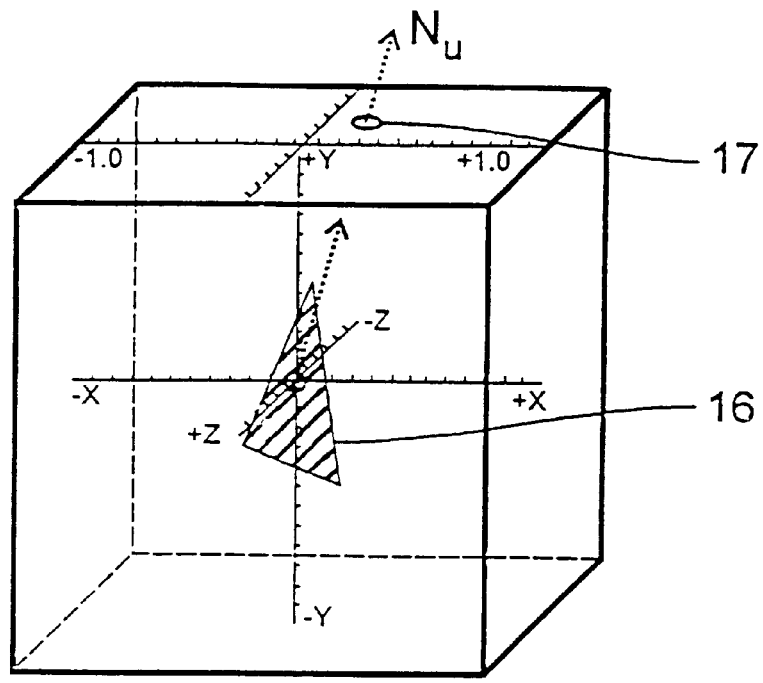
Figure 5B:
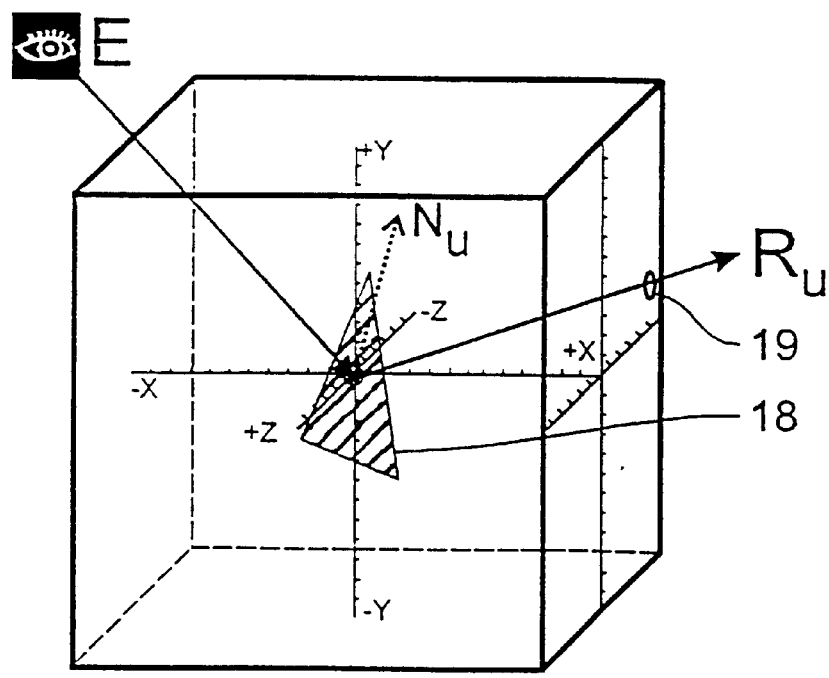
Figure 6:
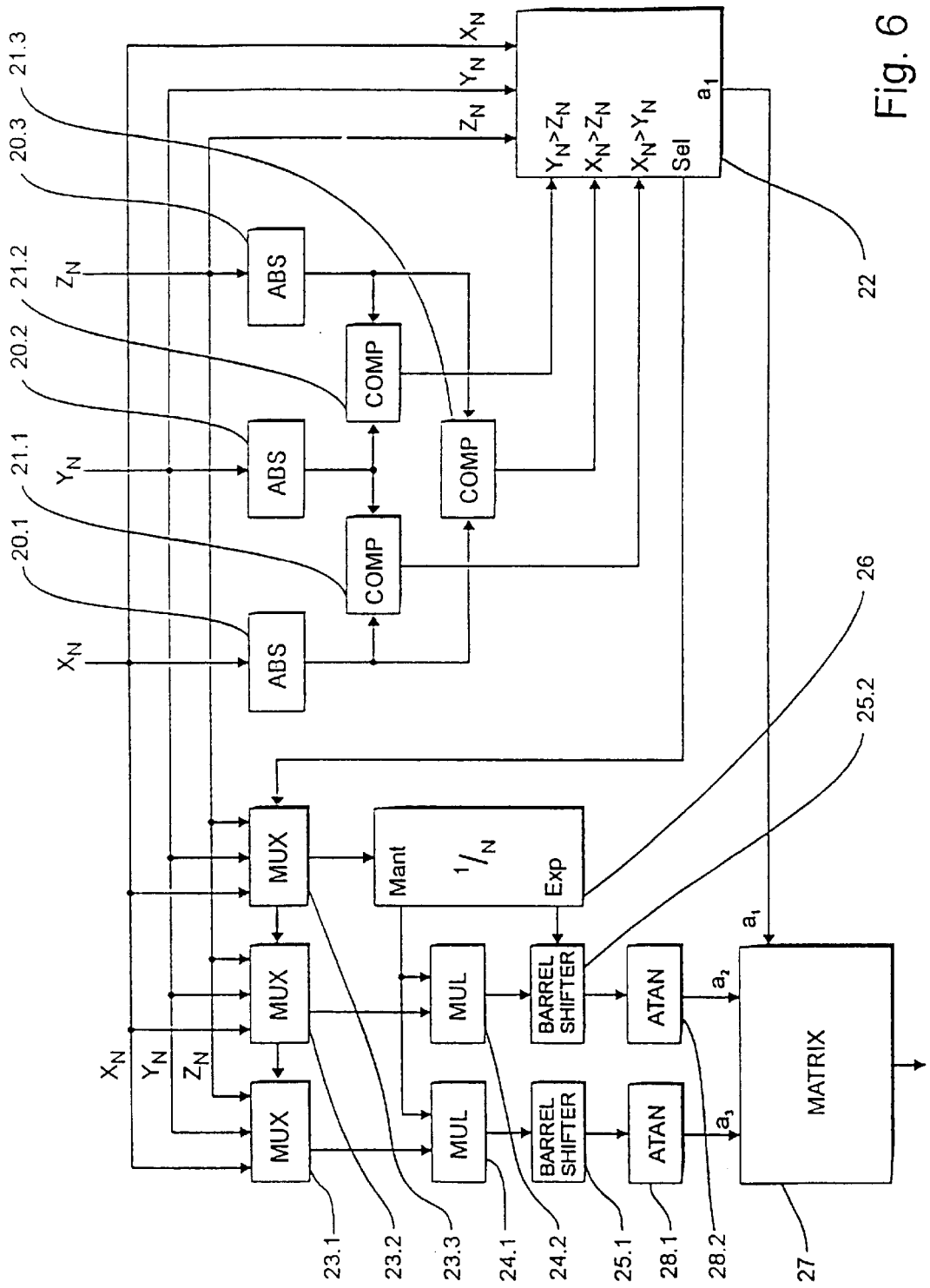
Figure 7:
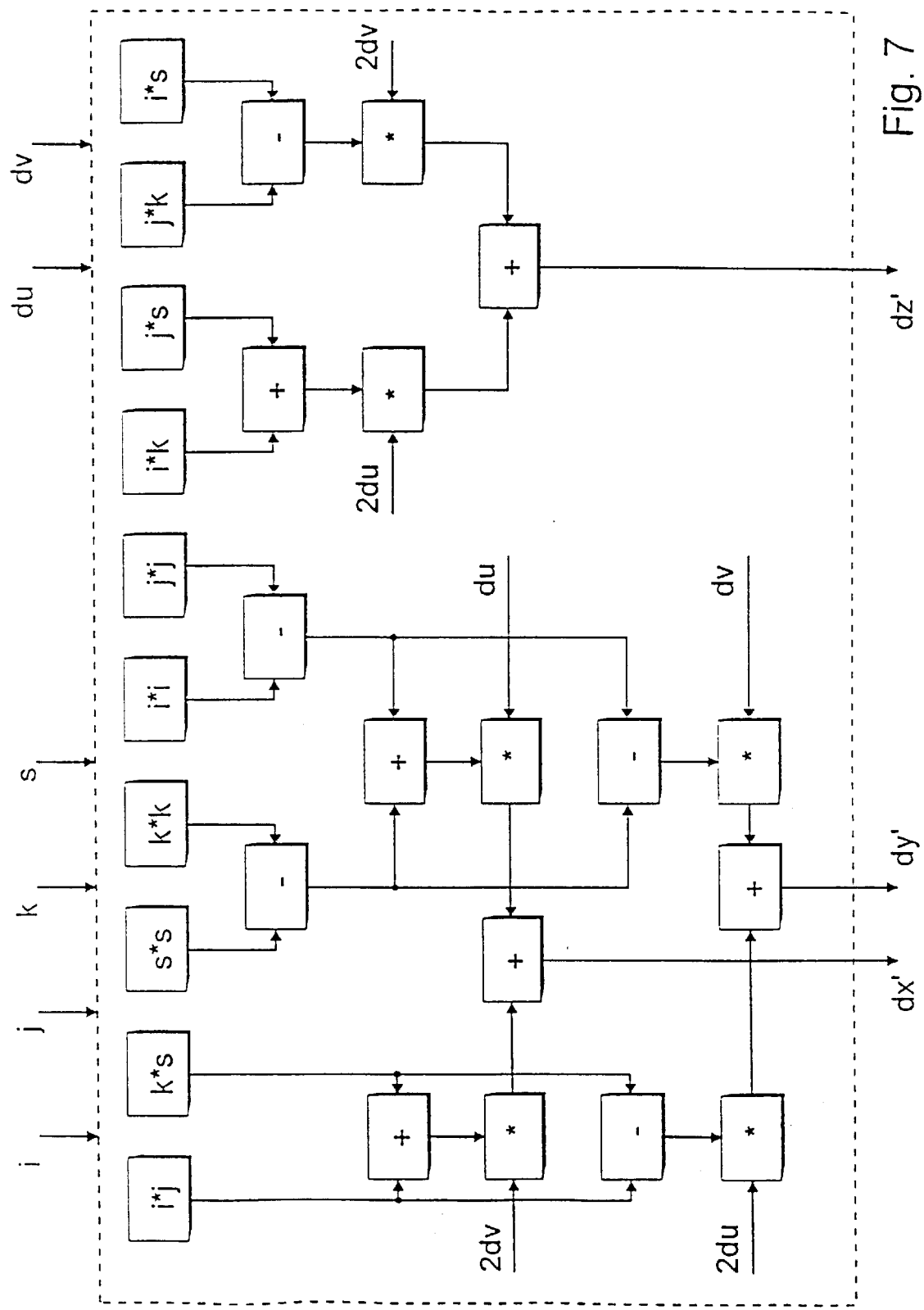
Figure 8:
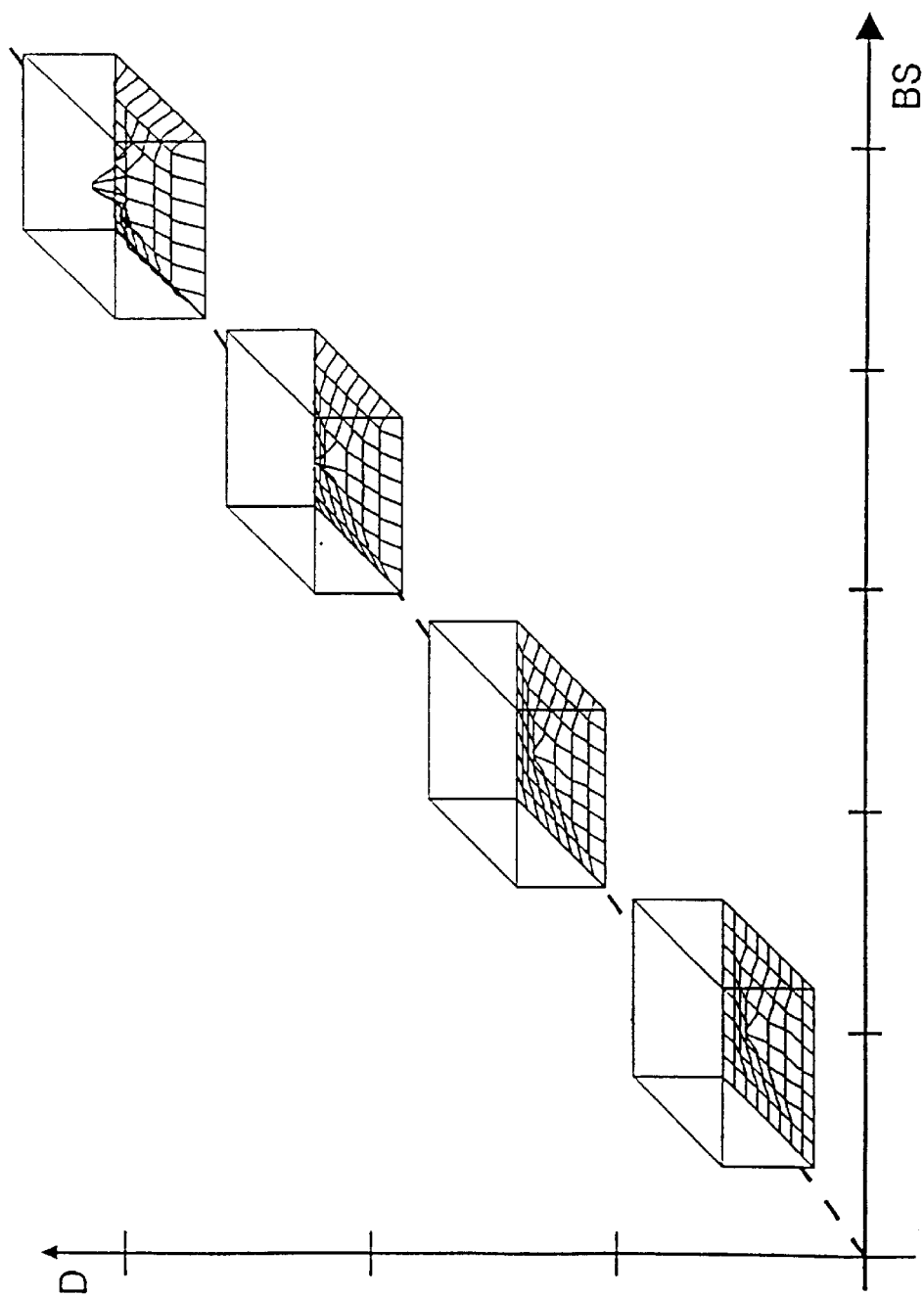

Other advantageous modifications of the invention are characterized in the dependent claims and described in detail below in the description of the preferred embodiment of the invention in conjunction with the figures. Shown are in:

FIG. 1 as a preferred embodiment of the invention, a circuit, shown as a block diagram, for simulating a relief structure, FIG. 2 as a detailed block diagram, the fourth calculation unit from FIG. 1, FIG. 3a a triangle of the grid model with the associated parameters as a projection onto the X-Y plane, FIG. 3b the inclination of the triangle surface with respect to the X and Y axes, FIG. 4 a schematic diagram for calculating a relief matrix using as an example a brick wall, FIG. 5a a cubic envelope surface that surrounds the triangle for calculating the local reflection factor in diffuse reflection at the pixel, FIG. 5b a cubic envelope surface that surrounds the triangle for calculating the local reflection factor in mirror reflection at the pixel, FIG. 6 a circuit for simulating the cubic envelope shown in FIGS. 5a and 5b, FIG. 7 a circuit for calculating the inclination of the pixel normal as a function of the inclination in the U, V coordinate system with the aid of quaternions, and FIG. 8 a diagram for explaining the scaling of a relief structure.

The circuit shown in FIG. 1 is used in imaging bodies or surfaces that are present in the form of a grid model. In this instance, the surface of the body to be represented comprises a plurality of triangles. The grid model is therefore defined by the spatial coordinates of the corner points.

The illustrated circuit serves particularly in simulating a relief structure of the surfaces.

For this purpose, the circuit receives, as an input value for each triangle, a parameter set that defines the spatial position of this triangle and the desired material properties of the surface.

Thus, the parameter set includes the spatial coordinates $(x_s, y_s, z_s)$ of a corner point of the triangle, the edge increments $\Delta lu$, $\Delta ru$, $\Delta ld$, $\Delta rd$, the number of scanlines $n_1$, $n_2$ of the triangle, and the inclination $\Delta zx$ of the triangle surface with respect to the X axis and the inclination $\Delta y$ of the triangle surface with respect to the Y axis. The parameter set further includes information regarding the color of the triangle surface, the absorption behavior, the transparency of the triangle surface and the like. The parameter set also includes a U,V coordinate pair for each corner point of the triangle, which pair defines the position of the respective corner point in the relief structure. The parameter set thus allocates each corner point of the triangle a point of the relief structure.

The parameter set data that define the spatial position of the triangle are supplied to a first assembly 1, which first divides the triangle surface into a plurality of parallel scanlines, then divides each scanline into a plurality of pixels. The spatial coordinates are subsequently calculated for each pixel. The description of FIGS. 3a and 3b includes details about the division of a triangle into pixels and the calculation of the spatial coordinates of the individual pixels.

The parameter set present at the circuit input is also supplied to a second assembly 2, which uses it to calculate the surface normal $(n_x, n_y, n_z)^T$ of the triangle surface. The second calculation unit 2 also uses the predetermined position of the viewer and the position $(x_s, y_s, z_s)$ of the triangle to calculate the viewing vector $(e_x, e_y, e_z)^T$, that is, the viewing direction of the viewer.

The parameter set is further supplied to a third assembly 3, which uses the U, V coordinates of the corner points of the triangle to interpolate the U, V coordinates of the individual pixels. Therefore, the associated point in the relief structure is calculated for each pixel.

A matrix M is also calculated, which maps the spatial coordinates X, Y, Z of the individual pixels onto the U, V coordinates of the respective pixels:

$$\begin{bmatrix} u \\ v \end{bmatrix} = \begin{bmatrix} x & y & z \end{bmatrix} \cdot \begin{bmatrix} M_{00} & M_{01} \\ M_{10} & M_{11} \\ M_{20} & M_{21} \end{bmatrix}$$

As already described above, the parameter set includes the U, V coordinates for each corner point of the triangle. Because the X, Y, Z coordinates of the three corner points are also known, an equation system of six equations is formed; the system has a total of six unknowns $M_{ij}$, and can be solved simply with the use of Cramer's Rule.

The matrix M serves, on the one hand, in rotating the relief structure parallel to the polygon surface, and—as will be described in detail below—on the other hand, in calculating a further matrix that orients the inclination vector with respect to the surface normal of the polygon surface, the vector resulting from the relief structure.

The U, V coordinates obtained in this manner for each pixel are supplied to an allocation unit 5, which allocates to each value pair (U, V) a relief value that defines the relief structure of the surface, and a texture value that defines the texture of the surface.

The allocation element has two two-dimensional storage matrices, namely the texture matrix and the relief matrix, which are respectively addressed by a U, V value pair.

The texture matrix defines a planar pattern that is superposed onto the surface of the triangle. Each U, V value pair addresses an element of the texture matrix that determines the brightness value or color value of the associated pixel on the surface of the triangle. The brightness of the triangle surface is therefore not totally consistent, but can fluctuate from pixel to pixel, depending on the pattern stored in the texture matrix. Consequently, the surface does not appear totally consistent, and therefore appears significantly more realistic. Thus, for example, the grain of a wood surface can be simulated. An important point in this connection is that the texture matrix only includes the brightness distribution or color distribution of the desired pattern, but does not simulate a relief structure.

The surface of the triangle therefore appears to be completely smooth.

The relief matrix, which, like the texture matrix, is addressed by the U, V value pair, serves in simulating a relief structure, that is, an arbitrary surface roughness.

The calculation of the relief matrix from a predetermined surface structure is explained in detail in the description of FIG. 4, using the example of a brick wall.

A decisive factor in the simulation of the relief structure is the orientation of the local surface normal in the different pixels, because this determines the reflection behavior of the surface. The relief matrix therefore defines how the surface normal is inclined at the individual points within the relief pattern with respect to the surface normal of the entire pattern. Hence, as can be seen from FIG. 4, the surface normal does not extend perpendicular to the wall in the joints of the brick wall, but at a diagonal. The relief matrix therefore defines a value Δu, which determines the inclination of the local surface normal with respect to the U axis, and a value Δv, which determines the inclination with respect to the V axis.

Because each pixel is mapped onto a U, V value pair, the relief matrix defines the relief structure to be impressed onto the surface of the triangle.

The circuit further includes a third assembly 4, which uses the surface normal $(n_x, n_y, n_z)^T$ and the local inclination values Δu and Δv to calculate the pixel normal, that is, the local surface normal $(n_x', n_y', n_z')$, at the location of each pixel.

To this end, this calculation unit multiplies the differences Δu and Δv by a mapping matrix A, and adds the product to the surface normal $(n_x, n_y, n_z)^T$:

$$\begin{bmatrix} n_x' \\ n_y' \\ n_z' \end{bmatrix} = \begin{bmatrix} n_x \\ n_y \\ n_z \end{bmatrix} + \begin{bmatrix} A_{00} & A_{01} \\ A_{10} & A_{11} \\ A_{20} & A_{21} \end{bmatrix} \cdot \begin{bmatrix} \Delta u \\ \Delta v \end{bmatrix}$$

The circuit of the fourth calculation unit is shown in detail in FIG. 2.

Corresponding to the relief structure stored in the relief matrix, the pixels of a triangle each have an inclined local surface normal—referred to hereinafter as pixel normal—so the brightness of the pixels can fluctuate within a triangle due to the angular dependency of the reflection behavior. In contrast to the level texture image that is likewise mapped onto the surface of the triangle, the brightness of a pixel is not only dependent on the position of the pixel within the triangle surface, but is also dependent on the position of the viewer and the light sources relative to the triangle surface. If the viewer changes positions, the perception of the relief structure changes correspondingly, while the perception of the texture image remains unchanged.

The local brightness value is calculated by a fourth assembly 6, which reads the respective value of the reflection factor out of a three-dimensional reflection matrix as a function of the position of the viewer, as determined by the viewing vector $(e_x, e_y, e_z)^T$ and the pixel normals $(n_x', n_y', n_z')$.

In this connection, a distinction must be made between diffuse reflection at the pixel and mirror reflection at the pixel. A three-dimensional reflection matrix 7 is provided for calculating the reflection factor for diffuse reflection, and a further three-dimensional reflection matrix 8 is provided for calculating the reflection factor for mirror reflection.

In diffuse reflection, it is assumed that the light is radiated uniformly in all direction, whereas in mirror reflection the radiation is effected according to the laws of geometrical optics, with the angle of incidence and the reflection angle being identical. Conversely, if a "line of sight" originating from the viewer is observed, rather than a light beam being emitted by the light source, this "line of sight" is reflected at the pixel in the direction of a reflection vector R. The pixel normal, the reflection vector and the viewing direction therefore lie in a plane, with the angle between the pixel normal and the viewing direction being identical to the angle between the reflection vector and the pixel normal.

The following applies for the reflection vector as a function of the pixel normal $N_U$ and the viewing direction, that is, the "line of sight" E:

$$\vec{R} = 2 \cdot \vec{N}_U \cdot (\vec{N}_U \cdot \vec{E}) + \vec{E} \cdot (\vec{N}_U \cdot \vec{N}_U)$$

or, written in terms of components:

$$\begin{bmatrix} r_x \\ r_y \\ r_z \end{bmatrix} = 2 \cdot \begin{bmatrix} n_x \\ n_y \\ n_z \end{bmatrix} \cdot (n_x \cdot e_x + n_y \cdot e_y + n_z \cdot e_z) +$$

$$\begin{bmatrix} e_x \\ e_y \\ e_z \end{bmatrix} \cdot (n_x^2 + n_y^2 + n_z^2)$$

The reflection matrix can be regarded as a cubic envelope surface, in the center of which the pixel is located. FIGS. 5a and 5b show this type of cubic envelope surface. Here a value of the reflection factor is associated with each surface element of the envelope surface.

Therefore, in order to calculate the diffuse reflection factor, it is necessary to determine the surface element of the cubic envelope surface that is intersected by the pixel normal or its extension. The value associated with this surface element is then the diffuse reflection factor.

Likewise, to calculate the mirror reflection, it is necessary to determine the point of the envelope surface at which the reflection vector or its extension penetrates the envelope surface. The value associated with this point of the envelope surface then defines the reflection factor in mirror reflection.

The values on the envelope surface thus define the illumination environment of the triangle, and correspond to an all-around recording of the environment from the perspective of the triangle. It is therefore advantageously possible to simulate a plurality of light sources. It is also possible to simulate arbitrarily-distributed light sources. Furthermore, the viewer can change his position randomly, that is, travel through virtual scenery, in which instance the viewing impression of the viewer is automatically adapted to the changed perspective.

As already described above, the cubic envelope surface is respectively simulated by a three-dimensional reflection matrix 7 or 8. The first dimension of the reflection matrix can assume values between 1 and 6, and indicates which side surface of the envelope surface is penetrated by the pixel normals or the reflection vector.

The other two dimensions of the reflection matrix are addressed as a function of the position of the point of intersection on the respective side surface. If the pixel normal or the reflection factor penetrates, for example, a side surface of the cubic envelope surface that is parallel to the X-Z plane, the Y coordinate of the point of intersection addresses the second dimension, and the Z coordinate of the point of intersection addresses the third dimension of the reflection matrix. The addressing is not effected directly by the spatial coordinates of the point of intersection, but indirectly through the interposing of a further calculation unit 9 or 10, which calculates the angle with respect to the axis of the coordinate system penetrating the side surface in two perpendicular planes.

The calculation of the reflection factors for diffuse reflection and mirror reflection is described in detail in the description of FIGS. 5a and 5b, respectively.

A reflection factor $r_d$ or $r_s$ for diffuse reflection and mirror reflection, respectively, is read out of the reflection matrix 7 or 8. Moreover, the allocation unit 5 provides a texture value t for each pixel. The two reflection factors $r_d$ and $r_s$ and the texture value t are supplied to a fade-in unit 11, which uses them and the color value c of the triangle surface to calculate a brightness value h.

At its output, the circuit then emits the spatial coordinates $x_i$, $y_i$, $z_i$ of the pixel, as well as the calculated brightness value h.

For display on a screen, the spatial coordinates of the pixel need only be converted into screen coordinates.

FIG. 2 shows the internal construction of the fourth calculation unit. The fourth calculation unit essentially comprises six multipliers 12.1 through 12.6, and three adders 13.1 through 13.3, which use the inclination components Δu and Δv, the transformation matrix A and the components $n_x$, $n_y$, $n_z$ to calculate the local surface normal (pixel normal) for each pixel of the triangle:

$$\begin{bmatrix} n'_x \\ n'_y \\ n'_z \end{bmatrix} = \begin{bmatrix} n_x \\ n_y \\ n_z \end{bmatrix} + \begin{bmatrix} A_{00} & A_{01} \\ A_{10} & A_{11} \\ A_{20} & A_{21} \end{bmatrix} \cdot \begin{bmatrix} \Delta u \\ \Delta v \end{bmatrix}$$

For this purpose, the coefficients $A_{ij}$ of the transformation matrix and respectively one of the inclination components Δu or Δv are present at the inputs of the multipliers 12.1 through 12.6. The output signals dxv, dxu, dyv, dyu, dzv, dzu of the multipliers 12.1 through 12.6 are supplied, along with the components $n_x$, $n_y$, $n_z$ of the surface normal of the triangle, to the adders 13.1 through 13.3, which use them to calculate the components $n'_x$, $n'_y$, $n'_z$ of the pixel normal.

As already mentioned in the description of FIG. 1, the input of the circuit receives a parameter set that includes, among other information, the spatial position of the triangle to be represented. FIGS. 3a and 3b illustrate the significance of these parameters by way of example.

The parameter set also includes the spatial coordinates $x_s$, $y_s$, $z_s$ of a corner point $P_{start}$ of the triangle. This corner point serves as the starting point, and defines the position of the triangle in space, while the edge increments Δlu, Δru, Δld, Δrd define the shape of the triangle and the position of the triangle relative to the coordinate axes.

Starting from the starting point $P_{start}$, the triangle is divided into scanlines, and each scanline is in turn divided into pixels. The individual scanlines respectively extend parallel to the X axis. The edge increment Δlu or Δld defines the inclination, relative to the Y axis, of the triangle edge to the left of the starting point, while the edge increment Δru or Δrd defines the inclination, relative to the Y axis, of the triangle edge on the right. In this way, the spatial coordinates of the initial and end points of each scanline can be calculated.

Because the scanlines extend parallel to the X axis, the Y coordinate of both the initial point and the end point of each scanline results from the Y coordinate $y_s$ of the starting point and the number of the scanline:

$$y_l = y_s + i \quad y_r = y_s + i$$

The X coordinate $x_1$ of the initial points of each scanline results accordingly from the X coordinate $x_s$ of the starting point $P_{start}$, the number i of the scanline and the edge increment Δlu or Δld. The edge increment Δlu is used within the first $n_1$ scanlines, and the edge increment Δld is used subsequently.

$$x_1 = x_s + \Delta lu \cdot i \text{ for } i \leq n,$$

$$x_1 = x_s + \Delta lu \cdot n_1 + (i - n_1) \cdot \Delta ld \text{ for } n_1 < i \leq n_1 + n_2$$

In the same way, the X coordinate $x_r$ of the end point of each scanline results from the X coordinate $x_s$ of the starting point $P_{start}$, the number i of the scanline and the edge increment $\Delta ru$ or $\Delta rd$. In this case, the edge increment $\Delta ru$ is used during the first $n_1$ scanlines, and the edge increment $\Delta rd$ is used subsequently:

$$x_r = x_s + \Delta ru \cdot i \text{ for } i \leq n_1$$

$$x_r = x_s + \Delta ru \cdot n_1 + (i - n_1) \cdot \Delta rd \text{ for } n_1 < i \leq n_1 + n_2$$

The Z coordinate $z_1$ of the initial point results from the Z coordinate $z_s$ of the starting point, the number of the scanline and the inclinations of the triangle surface with respect to the X and Y axes:

$$z_1 = z_s + i \cdot \Delta zy + (x_1 - x_s) \cdot \Delta zx$$

The scanlines are then divided into pixels, with the spatial coordinates for each pixel being calculated from the known coordinates of the initial and end points of the scanlines.

Because the scanlines extend parallel to the X axis, the Y coordinate of each pixel is identical to the Y coordinate of the associated scanline:

$$y_j = y_1$$

The X coordinate of each pixel results from the X coordinate $x_1$ of the initial point of the scanline, and the number j of the pixel in the scanline:

$$x_j = x_1 + j$$

The Z coordinate of a pixel results from the Z coordinate $z_1$ of the initial point of the associated scanline, the number j of the pixel within the scanline and the inclination $\Delta zx$ of the triangle surface relative to the X axis.

$$z_j = z_1 + j \cdot \Delta zy$$

In this way, the spatial coordinates $x_j$, $y_j$, $z_j$ are calculated for each pixel of the triangle surface.

FIG. 4 shows the surface of a wall comprising bricks 15, and the inclination values $\Delta u$ and $\Delta v$ that respectively result from the relief structure of the surface.

The joints 14 between the bricks 15 represent a groove-shaped depression in the surface of the brick wall. The brick wall is thus not exactly level, but possesses a relief structure.

A cross-section of the surface along the line $l_u$ is shown beneath the diagram. The upper line shows the course of the height H of the surface along the line $l_u$. The groove-shaped depressions between the bricks 15 can be seen clearly. Below this line is the inclination component $\Delta u$ resulting from this surface course. The inclination component $\Delta u$ therefore results from partial differentiation of the height level H:

$$\Delta u = -\frac{\partial H}{\partial u}$$

Finally, the local surface normal is shown below this line.

On the right sides, the surface profile of the brick wall is shown as cross-section along the line $l_v$. Shown next to this is the inclination component $\Delta v$, which results from this height profile and is calculated through partial differentiation of the height level:

$$\Delta v = -\frac{\partial H}{\partial v}$$

The inclination components $\Delta u$, $\Delta v$ determine the inclination of the local surface normal with respect to the surface normal of the ideally-smooth surface.

Because a partial differentiation requires a relatively large amount of time, the corresponding values for the desired relief structure—in this case the brick wall—are calculated in advance and stored in a two-dimensional matrix, the so-called relief matrix. Thus, a value of the two inclination components $\Delta u$ and $\Delta v$ is allocated to each point of the brick wall.

Determining the inclination components $\Delta u$, $\Delta v$ only requires one read access to the relief matrix that is addressed by the U, V value pair.

The cube illustrated in FIG. 5a serves in calculating the reflection factor in diffuse reflection at the pixel.

In diffuse reflection, the light is radiated uniformly in all directions, as explained above. The brightness of a pixel is therefore not dependent on the perspective of the viewer, but is determined exclusively by the position of the pixel normal relative to the illumination environment.

For calculating the reflection factor, the cube is positioned such that the relevant pixel lies in the center point of the cube. The cube thus forms an envelope surface around the pixel, with a value for the reflection factor being allocated to each surface element.

For calculating the reflection factor, the point of intersection 17 of the pixel normal $N_U$ and the envelope surface is determined, and the associated value of the envelope surface is defined as the reflection factor.

The values on the envelope surface therefore define the illumination environment of the triangle 16, and correspond to an all-around. recording of the environment from the perspective of the triangle 16. It is therefore advantageously possible to simulate a plurality of light sources. The simulation of arbitrarily-distributed light sources is also possible.

The cube is embodied here as a three-dimensional matrix, with the first dimension of the matrix indicating which side surface of the cube is intersected by the pixel normal $N_U$, while the two other dimensions represent the position of the point of intersection 17 within the side surface.

Which envelope surface is penetrated by the pixel normal $N_U$—in other words, the addressing of the first dimension of the matrix—is solely dependent on the relationship of the individual components of the pixel normal $N_U$. For example, if the X component is larger in amount than the two other components and greater than zero, the pixel normal $N_U$ penetrates the side surface of the envelope surface that is intersected at a right angle by the positive branch of the X axis, and the first dimension of the reflection matrix correspondingly assumes the value of 1.

In general, the following results for the addressing value $a_1$ of the first dimension of the reflection matrix as a function of the components $n_x$, $n_y$, $n_z$ of the pixel normal $N_U$:

$$a_1 = \begin{cases} 1 & \text{if } \max[n_x, n_y, n_z] = n_x > 0 \\ 2 & \text{if } \max[n_x, n_y, n_z] = n_x < 0 \\ 3 & \text{if } \max[n_x, n_y, n_z] = n_y > 0 \\ 4 & \text{if } \max[n_x, n_y, n_z] = n_y < 0 \\ 5 & \text{if } \max[n_x, n_y, n_z] = n_z > 0 \\ 6 & \text{if } \max[n_x, n_y, n_z] = n_z < 0 \end{cases}$$

The other two dimensions $a_2$, $a_3$ of the reflection matrix are addressed as a function of the position of the point of intersection 17 on the respective side surface. If the pixel normal or reflection factor penetrates, for example, a side surface of the cubic envelope surface that extends parallel to the X-Z plane, the Y coordinate of the point of intersection addresses the second dimension, and the Z coordinate of the point of intersection addresses the third dimension of the reflection matrix.

In general, the following applies for addressing the other two dimensions $a_2$, $a_3$ of the reflection matrix:

$$a_2 = \begin{cases} \arctan\left(\frac{n_y}{|n_x|}\right) & \text{if } a_1 = 1 \text{ or } 2 \\ \arctan\left(\frac{n_x}{|n_y|}\right) & \text{if } a_1 = 3 \text{ or } 4 \\ \arctan\left(\frac{n_x}{|n_z|}\right) & \text{if } a_1 = 5 \text{ or } 6 \end{cases}$$

$$a_3 = \begin{cases} \arctan\left(\frac{n_z}{|n_x|}\right) & \text{if } a_1 = 1 \text{ or } 2 \\ \arctan\left(\frac{n_z}{|n_y|}\right) & \text{if } a_1 = 3 \text{ or } 4 \\ \arctan\left(\frac{n_y}{|n_z|}\right) & \text{if } a_1 = 5 \text{ or } 6 \end{cases}$$

FIG. 5b shows a further cube, which serves in calculating the reflection factor in mirror reflection.

In mirror reflection at a surface, the reflection is not uniform in all directions, as was assumed in the above-described diffuse reflection, but in a preferred direction of light reflection. According to the laws of geometric optics, this direction of light reflection results from the position of the surface normal and the direction of light incidence. A light beam originating from a light source thus impacts the surface, and is reflected at the surface in the direction of light reflection, with the angles of incidence and reflection being identical with respect to the surface normal. Conversely, if the "line of sight" originating from the viewer is observed instead of the light beam originating from the light source, this "line of sight" is reflected at the surface according to the same laws, and finally impacts an object of the environment. In this way, it can be determined which part of the environment is perceived by a viewer when mirror reflection occurs at a pixel.

For this purpose, a reflection vector Ru, which corresponds to the "line of sight" reflected at the pixel. Because the angles of incidence and reflection are identical in mirror reflection, the following results for the reflection vector $R_U$ from the pixel normal $N_U$ and the viewing vector E:

$$\vec{R} = 2 \cdot \vec{N}_U \cdot \left(\vec{N}_U \cdot \vec{E}\right) + \vec{E} \cdot \left(\vec{N}_U \cdot \vec{N}_U\right)$$

or, written in terms of components:

$$\begin{bmatrix} r_x \\ r_y \\ r_z \end{bmatrix} = 2 \cdot \begin{bmatrix} n_x \\ n_y \\ n_z \end{bmatrix} \cdot (n_x \cdot e_x + n_y \cdot e_y + n_z \cdot e_z) + \begin{bmatrix} e_x \\ e_y \\ e_z \end{bmatrix} \cdot (n_x^2 + n_y^2 + n_z^2)$$

As in the calculation of the reflection factor in diffuse reflection, the cube is disposed such that the relevant triangle 18 lies in the center of the cube. The cube therefore forms an envelope surface that surrounds the pixel, with a value of the reflection factor being allocated to each surface element of the envelope surface. For determining the reflection factor, therefore, it is necessary to determine the surface element of the envelope surface that is penetrated by the reflection vector $R_U$ or its extension. The value associated with this surface element is then the reflection factor.

The cubic envelope surface thus represents an all-around recording of the environment from the perspective of the pixel.

The cubic envelope surface is simulated by a three-dimensional matrix, as in diffuse reflection. Addressing of the first dimension is effected depending on which side surface is penetrated by the reflection factor. The following applies for the addressing value $a_1$ of the first dimension of the matrix:

$$a_1 = \begin{cases} 1 & \text{if } \max[r_x, r_y, r_z] = r_x > 0 \\ 2 & \text{if } \max[r_x, r_y, r_z] = r_x < 0 \\ 3 & \text{if } \max[r_x, r_y, r_z] = r_y > 0 \\ 4 & \text{if } \max[r_x, r_y, r_z] = r_y < 0 \\ 5 & \text{if } \max[r_x, r_y, r_z] = r_z > 0 \\ 6 & \text{if } \max[r_x, r_y, r_z] = r_z < 0 \end{cases}$$

The addressing of the other two dimensions of the matrix is effected as a function of the position of the point of intersection 19 within the side surface that is penetrated by the reflection vector $R_U$. The following applies for the addressing values $a_2$, $a_3$:

$$a_2 = \begin{cases} \arctan\left(\frac{r_y}{|r_x|}\right) & \text{if } a_1 = 1 \text{ or } 2 \\ \arctan\left(\frac{r_x}{|r_y|}\right) & \text{if } a_1 = 3 \text{ or } 4 \\ \arctan\left(\frac{r_x}{|r_z|}\right) & \text{if } a_1 = 5 \text{ or } 6 \end{cases}$$

$$a_3 = \begin{cases} \arctan\left(\frac{r_z}{|r_x|}\right) & \text{if } a_1 = 1 \text{ or } 2 \\ \arctan\left(\frac{r_z}{|r_y|}\right) & \text{if } a_1 = 3 \text{ or } 4 \\ \arctan\left(\frac{r_y}{|r_z|}\right) & \text{if } a_1 = 5 \text{ or } 6 \end{cases}$$

Depending on the addressing values $a_1$, $a_2$, $a_3$l the reflection factor for mirror reflection is then read out of the matrix, and is considered in the calculation of the pixel brightness, along with the reflection factor for diffuse reflection and the texture value of the pixel.

An advantage here is that the perspective of the viewer can be changed without necessitating the re-calculation of the reflection matrix. The viewer can therefore change his perspective relative to the model in a real-time representation.

FIG. 6 shows a block diagram of a circuit for addressing a three-dimensional matrix with the use of a vector, with the three-dimensional matrix simulating a cubic envelope surface that surrounds the origin of the vector.

The illustrated circuit is therefore suited for calculating the reflection factors for diffuse or mirror reflection with the cubes shown in FIGS. 5a and 5b, respectively.

Moreover, the circuit can be used wherever a vector addresses a three-dimensional matrix that simulates a cubic envelope surface, for example, in place of the addressing unit 6, the calculation unit 9 or 10 and the matrix 7 or 8 in FIG. 1.

At its input, the circuit receives the spatial coordinates $x_N$, $y_N$, $z_N$ of the addressing vector.

The circuit first determines which side surface of the cubic envelope surface is intersected by the vector. For this purpose, the largest spatial coordinate of the addressing vector is determined. If, for example, the X coordinate of the vector is the largest, the vector intersects the side surface of the cubic envelope surface that extends parallel to the Y-Z plane.

The spatial coordinates $x_N$, $y_N$, $z_N$ are therefore supplied to a respective calculation unit 20.1, 20.2, 20.3, which forms the absolute value of the spatial coordinates. The absolute values of the spatial coordinates—in other words, the output signals of the calculation units 20.1, 20.2, 20.3—are subsequently supplied in pairs to three comparators 21.1, 21.2, 21.3, which compare the absolute values of the spatial coordinates.

The output signals of the comparators 21.1, 21.2, 21.3 are then supplied to an addressing unit 22, which calculates the addressing value $a_1$ for the first dimension of the three-dimensional matrix 27. In the process, the addressing unit 22 compares the output signals of the comparators 21.1, 21.2, 21.3, and uses the result and the operational signs to calculate the addressing value $a_1$ according to the following rule:

$$a_1 = \begin{cases} 1 & \text{if } x_N \geq y_N \text{ or } x_N \geq z_N \text{ or } x_N \geq 0 \\ 2 & \text{if } x_N \geq y_N \text{ or } x_N \geq z_N \text{ or } x_N \geq 0 \\ 3 & \text{if } y_N \geq x_N \text{ or } y_N \geq z_N \text{ or } y_N \geq 0 \\ 4 & \text{if } y_N \geq x_N \text{ or } y_N \geq z_N \text{ or } y_N < 0 \\ 5 & \text{if } z_N \geq y_N \text{ or } z_N \geq x_N \text{ or } z_N \geq 0 \\ 6 & \text{if } z_N \geq y_N \text{ or } z_N \geq x_N \text{ or } z_N \geq 0 \end{cases}$$

The circuit further determines the position at which the addressing vector penetrates the side surface of the cubic envelope surface. The coordinates of this point of intersection serve in addressing the second and third dimension of the matrix 27.

To this end, the circuit forms the quotient from one of the spatial coordinates that is smaller with respect to amount, and the largest spatial coordinate. The addressing unit therefore generates a selection signal Sel, which is supplied to the multiplexers 23.1, 23.2, 23.3.

The multiplexer 23.3 selects the largest spatial coordinate, and supplies its value to the calculation unit 26, which uses it to form the reciprocal value, and outputs it separately as mantissa and exponent.

The two other multiplexers 23.1, 23.2 respectively select one of the two smaller spatial coordinates as counters.

The output signals of the multiplexers 23.1, 23.2 are then respectively supplied, along with the mantissa of the reciprocal value of the largest spatial coordinate, the mantissa having been determined by the calculation unit 26, to a multiplier 24.1, 24.2, which multiplies the smaller spatial coordinates by the mantissa of the reciprocal value of the largest spatial coordinate.

The output signal of the multipliers 24.1, 24.2 is supplied to two shift registers 25.1, 25.3, which perform multiplication with the exponents calculated by the calculation unit 26.

The following applies for the output signals $a_2$, $a_3$ of this addressing logic, for example if $x_N$ is the component having the largest value:

$$a_2 = \frac{y_N}{x_n} \qquad a_3 = \frac{z_N}{x_N}$$

The output signals $a_2$, $a_3$ then address the second or third dimension, respectively, of the matrix 27, which is embodied, for example, as a semiconductor memory.

The circuit illustrated in FIG. 7 serves in calculating the inclination of the pixel normal that is caused by the simulated relief structure, as a function of the inclination components $\Delta u$, $\Delta v$ in the U, V coordinate system.

The circuit receives, as input values, the four components i, j, k, s of the quaternion, as well as the inclination components $\Delta u$, $\Delta v$ in the U, V coordinate system. The task of the quaternion is to orient the inclination vector determined in the U, V coordinate system with respect to the pixel normal of the smooth surface in the X, Y, Z coordinate system. The inclination vector must be oriented at a right angle to the pixel normal in the X, Y, Z coordinate system, so that the addition of these two vectors results in an inclination of the pixel normals.

At its output, the circuit then outputs the components dx', dy', dz' of the inclination vector that must be added to the pixel normals.

The components dx', dy', dz' of the inclination vector are calculated according to the following formulas:

$$dx' = \Delta u \cdot (s^2 - k^2 + i^2 - j^2) + 2 \cdot \Delta v \cdot (i \cdot j + k \cdot s)$$

$$dy' = \Delta v \cdot (s^2 - k^2 + i^2 + j^2) + 2 \cdot \Delta u \cdot (i \cdot j - k \cdot s)$$

$$dz' = 2 \cdot \Delta u \cdot (i \cdot k + j \cdot s) + 2 \cdot \Delta v \cdot (j \cdot k - i \cdot s)$$

For performing this task, the circuit has 16 multipliers, 6 adders and 5 subtracters, which perform the calculation operations shown above as formulas.

The diagram shown in FIG. 8 clarifies the scaling of a relief structure with the use of a scaling factor BS (Bump Scale). The scaling factor BS, which permits a continuous setting of the relief effect of the relief structure simulated on the object's surface, is shown on the abscissa. Correspondingly, a value D, which represents the spatial depth of the relief structure appearing on the object's surface, is shown on the ordinate.

To explain the dependency, the three-dimensional relief-structure formers are shown for four values of the scaling factor BS; these formers result from the respective value of the scaling factor BS. It can be seen clearly that the relief effect of the relief-structure image appearing on the object's surface increases with the scaling factor BS in the representation. This is achieved in that the inclination values that have been read out of the relief matrix are first multiplied by the scaling factor BS before the course of the surface is calculated from the local surface normal of the smooth surface and the respective inclination values, taking into consideration the relief structure.

The invention is not limited in its embodiment to the above-described, preferred embodiments. Rather, numerous variations are conceivable that make use of the illustrated solution, even in fundamentally different embodiments.

What is claimed is:

1. An image-processing method for simulating a relief structure in representing objects that particularly comprise at least one polygon surface, in which a first assembly of a calculation unit uses a first parameter set representing the position of the polygon surface to calculate a plurality of coordinate sets (x, y, z, u, v), which represent the position of a respective pixel of the polygon surface, and, for each coordinate set (x, y, z, u, v), a second assembly uses the first parameter set to calculate a second parameter set ($n_x$, $n_y$, $n_z$), which represents the position of the surface normal of the polygon surface, without taking into consideration the relief structure, a third assembly uses the second parameter set ($n_x$, $n_y$, $n_z$) and an inclination value (du, dv) to calculate a third parameter set ($n'_x$, $n'_y$, $n'_z$), which represents the position of the local surface normal of the polygon surface, taking into consideration the relief structure, a fourth assembly determines a value (h) that represents the brightness or the color of a pixel, and creates the impression of a relief structure, as a function of the third parameter set ($n'_x$, $n'_y$, $n'_z$), characterized in that a storage location of a first storage matrix is addressed by each coordinate set (x, y, z, u, v), each storage location of the first storage matrix contains a parameter set that represents the inclination of the local surface normal, taking into consideration the relief structure, relative to the surface normal of the polygon surface, without taking into consideration the relief structure, and the inclination value (du, dv) is read out of the first storage matrix.

2. The method according to claim 1, characterized in that the polygon surface is planar, and the second parameter set ($n_x$, $n_y$, $n_z$) represents the spatial position of the surface normal of the entire polygon surface.

3. The method according to claim 1, characterized in that the polygon surface is curved, and the first parameter set represents the spatial position of the polygon surface and the corner-point normals, and the second parameter set ($n_x$, $n_y$, $n_z$) is calculated from the first parameter set and a respective coordinate set (x, y, z, u, v), and represents the spatial position of the local surface normal in a respective pixel.

4. The method according to claim 1, characterized in that the fourth assembly uses the third parameter set ($n'_x$, $n'_y$, $n'_z$), and a predetermined fourth parameter set ($e_x$, $e_y$, $e_z$) that represents the perspective, and/or a predetermined fifth parameter set that represents the illumination conditions, to calculate the value (h) that represents the brightness and/or the color of a pixel and creates the impression of a relief structure.

5. The method according to claim 1, characterized in that the fourth assembly uses the third parameter set ($n'_x$, $n'_y$, $n'_z$) and the fourth parameter set ($e_x$, $e_y$, $e_z$) to calculate two angular values for each coordinate set (x, y, z, u, v), which values represent the position of the local surface normal of the polygon surface, taking into consideration the relief structure, relative to the viewing direction of the viewer, a second storage matrix is addressed by the two angular values, each storage location of the second storage matrix contains a value that represents the brightness of the polygon surface for a specific perspective, and the value (h) that represents the brightness and/or the color is read out of the second storage matrix.

6. The method according to claim 1, characterized in that a third storage matrix that represents a cubic envelope surface surrounding a pixel is addressed by the third parameter set ($n'_x$, $n'_y$, $n'_z$)

a first reflection value ($r_d$) representing the brightness of a pixel caused by diffuse reflection is read out of the third storage matrix, and the value (h) representing the brightness or the color is calculated as a function of the first reflection value ($r_d$).

7. The method according to claim 1, characterized in that an addressing value representing the spatial position of a light beam ($R_U$), which reaches the viewer following mirror reflection at the pixel, is calculated from the third parameter set ($n'_x$, $n'_y$, $n'_z$), the fourth parameter set ($e_x$, $e_y$, $e_z$) and a respective coordinate set (x, y, z, u, v), a fourth storage matrix), which represents a cubic envelope surface that surrounds a pixel, is addressed by the addressing value, a second reflection value ($r_s$) that represents the brightness of a pixel caused by mirror reflection is read out of the fourth storage matrix, and the value (h) representing the brightness and/or the color is calculated as a function of the second reflection value ($r_s$).

8. The method according to claim 1, characterized in that the polygon surface is triangular.

9. The method according to claim 1, characterized in that a polygon should be understood to be an object whose surface structure is reduced, that is, less detailed, than the fine surface structure to be represented.

10. The method according to claim 1, characterized in that, for setting the relief effect of the relief structure to be simulated, a multiplier multiplies the inclination value (du, dv) by a predetermined scaling factor (BS) after the inclination value has been read out of the first storage matrix.

11. An image-processing apparatus for executing the method according to claim 1, having a calculation unit that includes an input for receiving a first parameter set that represents the position of the polygon surface, a first assembly that uses the first parameter set to calculate a plurality of coordinate sets (x, y, z, u, v) that represent the position of a respective pixel, a second assembly for calculating a second parameter set ($n_x$, $n_y$, $n_z$) for each coordinate set (x, y, z, u, v), the parameter set representing the position of the surface normal of the polygon surface, without taking into consideration the relief structure, a third assembly that uses the second parameter set ($n_x$, $n_y$, $n_z$) and an inclination value (du, dv) to calculate a third parameter set ($n'_x$, $n'_y$, $n'_z$) for each coordinate set (x, y, z, u, v), the parameter set representing the position of the local surface normal of the polygon surface, taking into consideration the relief structure, a fourth assembly for calculating a value (h) for each coordinate set (x, y, z, u, v), the value representing the brightness and/or the color of a respective pixel, as a function of the third parameter set ($n'_x$, $n'_y$, $n'_z$), characterized in that a first storage matrix having a plurality of storage locations is provided for determining the inclination value (du, dv), each storage location of the first storage matrix contains a parameter set (du, dv) that represents the inclination of the local surface normal of the polygon, surface, taking into consideration the relief structure, with respect to the surface normal of the polygon surface, without taking into consideration the relief structure, and a first addressing unit is provided for addressing the first storage matrix as a function of a respective coordinate set (x, y, z, u, v).

12. The apparatus according to claim 11, characterized in that the fourth assembly has a second addressing unit for calculating two angular values from the third parameter set ($n'_x$, $n'_y$, $n'_z$) and the fourth parameter set ($e_x$, $e_y$, $e_z$), with the two angular values representing the position of the local surface normal, taking into consideration the relief structure, relative to the viewing direction of the viewer, the fourth assembly has a second storage matrix, which is addressed by the two angular values, and each storage location of the second storage matrix contains a predetermined value that represents the brightness or the color of the polygon surface for a certain perspective.

13. The apparatus according to claim 11, characterized by a third storage matrix having a plurality of storage locations, which each storage location containing a reflection value ($r_d$) that represents the brightness of a respective pixel that is caused by diffuse reflection, and a third addressing unit for addressing the third storage matrix as a function of the third parameter set ($n'_x$, $n'_y$, $n'_z$), and for reading out the reflection value ($r_d$).

14. The apparatus according to claim 11, characterized by a fourth addressing unit that uses the third parameter set ($n'_x$, $n'_y$, $n'_z$), the fourth parameter set ($e_x$, $e_y$, $e_z$) and a respective coordinate set (x, y, z, u, v) to calculate an addressing value that represents the spatial position of a light beam that reaches the viewer following mirror reflection at the pixel, and a fourth storage matrix that is disposed downstream of the fourth addressing unit and can be addressed by the addressing value, the matrix containing values ($r_s$) that represent the brightness of the pixels that is caused by mirror reflection.

15. The apparatus according to claim 13, characterized in that the fourth assembly has a fade-in unit for calculating the value (h) that represents the brightness and/or the color, as a function of the first reflection value ($r_d$) and/or the second reflection value ($r_s$).

16. The apparatus according to claim 11, characterized in that a multiplier is disposed downstream of the first storage matrix and the third assembly for scaling the inclination values (du, dv) in order to set the relief effect.

17. The apparatus according to claim 11, characterized in that a plurality of storage matrices is provided for simulating a dynamic relief structure, the matrices respectively containing the inclination values (du, dv) of an instantaneous recording of the relief structure, and a selection unit is provided for sequential selection of a respective storage matrix serving in simulating a relief structure.

18. The apparatus according to claim 1, characterized in that a plurality of storage matrices is provided for dynamic texture simulation, the matrices containing color or brightness values representing an instantaneous recording of the texture image, and a selection unit is provided for sequential selection of a respective storage matrix serving in simulating a texture.

19. The apparatus according to claim 1, characterized in that the storage matrix serving in texture simulation is connected to a video- or computer-graphics system for generating a dynamic texture image.

* * * * *